US010810387B2

(12) United States Patent
Nikitin et al.

(10) Patent No.: US 10,810,387 B2
(45) Date of Patent: Oct. 20, 2020

(54) METHOD, SYSTEM AND APPARATUS FOR LOCATING RFID TAGS

(71) Applicant: Hand Held Products, Inc., Fort Mill, SC (US)

(72) Inventors: Pavel Nikitin, Seattle, WA (US); Rene Martinez, Seattle, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 45 days.

(21) Appl. No.: 16/048,636

(22) Filed: Jul. 30, 2018

(65) Prior Publication Data

US 2020/0034583 A1    Jan. 30, 2020

(51) Int. Cl.
*G06K 7/10* (2006.01)

(52) U.S. Cl.
CPC ..... *G06K 7/10099* (2013.01); *G06K 7/10366* (2013.01)

(58) Field of Classification Search
CPC ................................................. G06K 7/10099
USPC ........................................ 235/451; 340/572.1
See application file for complete search history.

(56) References Cited

U.S. PATENT DOCUMENTS

| 6,963,301 | B2 | 11/2005 | Schantz et al. | |
|---|---|---|---|---|
| 8,248,210 | B2 | 8/2012 | Nikitin et al. | |
| 2006/0107307 | A1* | 5/2006 | Knox | H04L 63/0492 726/2 |
| 2008/0143482 | A1* | 6/2008 | Shoarinejad | G01S 7/003 340/10.1 |
| 2008/0143584 | A1* | 6/2008 | Shoarinejad | G01S 13/751 342/127 |
| 2009/0085746 | A1* | 4/2009 | Erickson | G06K 7/0008 340/572.1 |
| 2010/0019955 | A1* | 1/2010 | Durgin | G01S 13/756 342/156 |

(Continued)

FOREIGN PATENT DOCUMENTS

| EP | 1725889 | 9/2005 |
|---|---|---|
| EP | 1794951 | 4/2006 |

(Continued)

OTHER PUBLICATIONS

Nikitin, Pavel V., et al., "Phase Based Spatial Identification of UHF RFID Tags", 2010 IEEE International Conference on RFID, Apr. 14-16, 2010, pp. 102-109, IEEE, Orlando, Florida.

(Continued)

*Primary Examiner* — Allyson N Trail
(74) *Attorney, Agent, or Firm* — Alston & Bird LLP

(57) ABSTRACT

Provided herein is an RFID reader system and method for determining an RFID tag distance. The RFID reader receives a first backscattered signal from an RFID tag in response to transmission of a first RF interrogation signal, and determines a first phase angle of the first backscattered signal. A radio transceiver device receives a second backscattered signal in response to transmission of a second RF interrogation signal, and determines a second phase angle of the second backscattered signal. A main control unit determines a plurality of first distances and a second distance between the RFID reader and the RFID tag based on the first phase angle and the second phase angle, and select one of the plurality of first distances with respect to the determined second distance as a final distance.

20 Claims, 15 Drawing Sheets

(56) References Cited

U.S. PATENT DOCUMENTS

| | | | |
|---|---|---|---|
| 2013/0030931 A1* | 1/2013 | Moshfeghi | G01S 19/48 |
| | | | 705/16 |
| 2014/0203989 A1 | 7/2014 | Jeong et al. | |
| 2014/0266619 A1* | 9/2014 | Ali | G01S 13/00 |
| | | | 340/10.1 |
| 2014/0285324 A1 | 9/2014 | Austin | |
| 2017/0270323 A1* | 9/2017 | Butler | G06K 19/0723 |
| 2017/0315208 A1* | 11/2017 | Sadr | G01S 5/0263 |
| 2018/0247092 A1* | 8/2018 | Khojastepour | G06K 7/10079 |

FOREIGN PATENT DOCUMENTS

| | | |
|---|---|---|
| EP | 3232414 A1 | 10/2017 |
| WO | 2005/091013 A1 | 9/2005 |
| WO | 2006/039119 A1 | 4/2006 |

OTHER PUBLICATIONS

Ussmueller, Thomas, et al., "A Multi-standard HF/UHF RFID TAG with Integrated Sensor Interface and Localization Capability", 2012 IEEE International Conference on RFID, Apr. 3-5, 2012, pp. 66-73, IEEE, Orlando, Florida.

Extended European Search Report for Application No. 19188952.6, dated Jan. 15, 2020, 8 pages.

Communication pursuant to Rules 70(2) and 70a(2) for European Application No. 19188952.6, dated Feb. 17, 2020, 2 pages.

\* cited by examiner

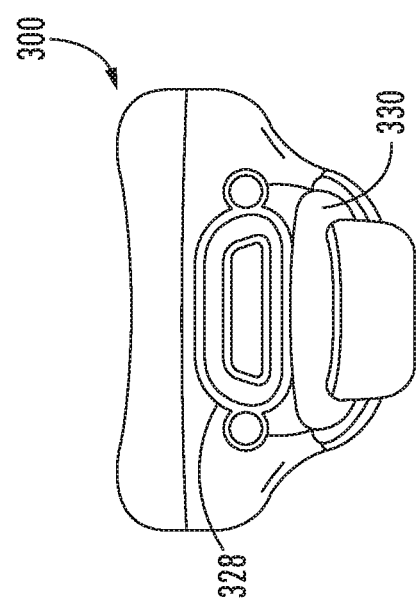
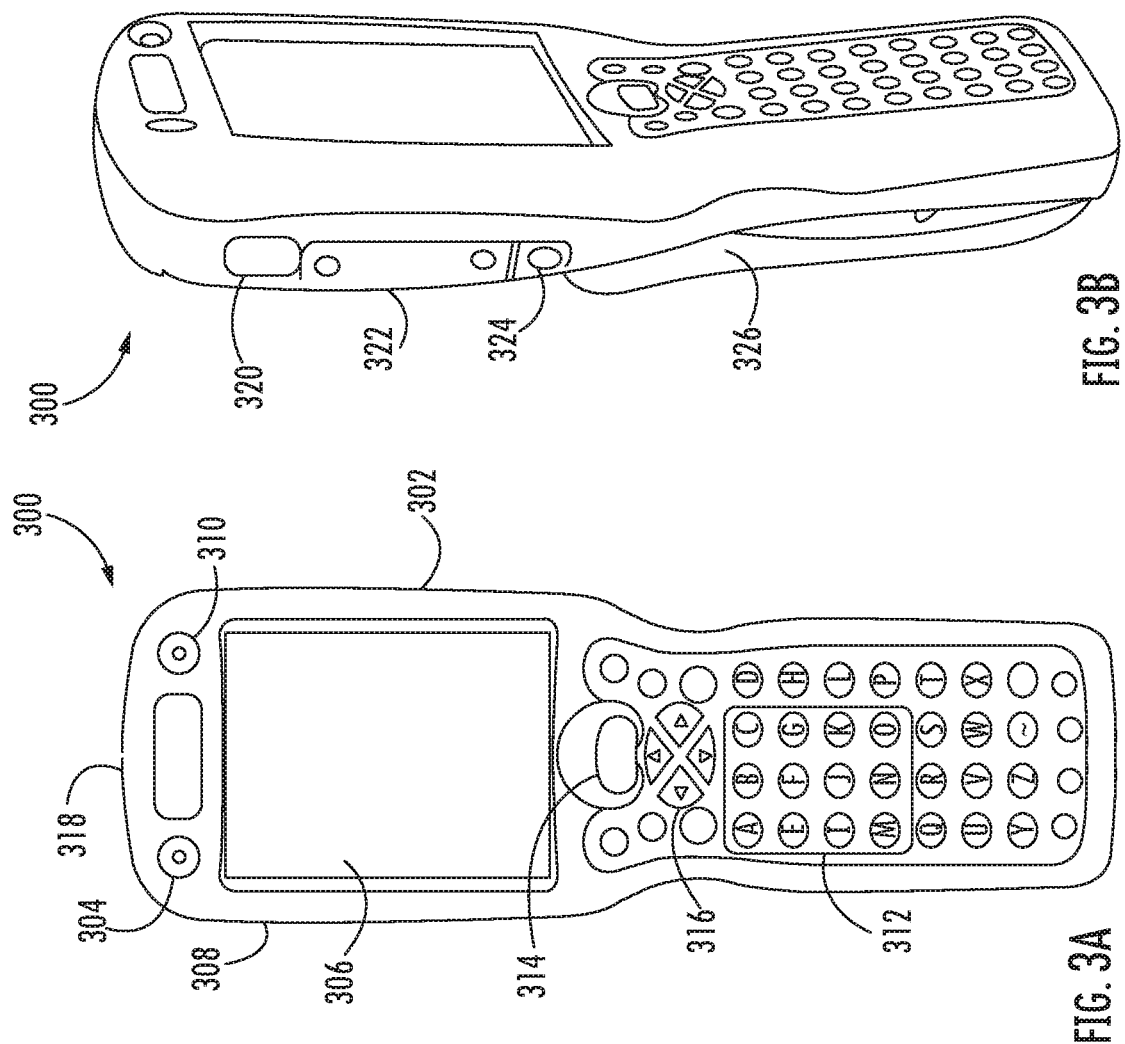
FIG. 3C
FIG. 3B
FIG. 3A

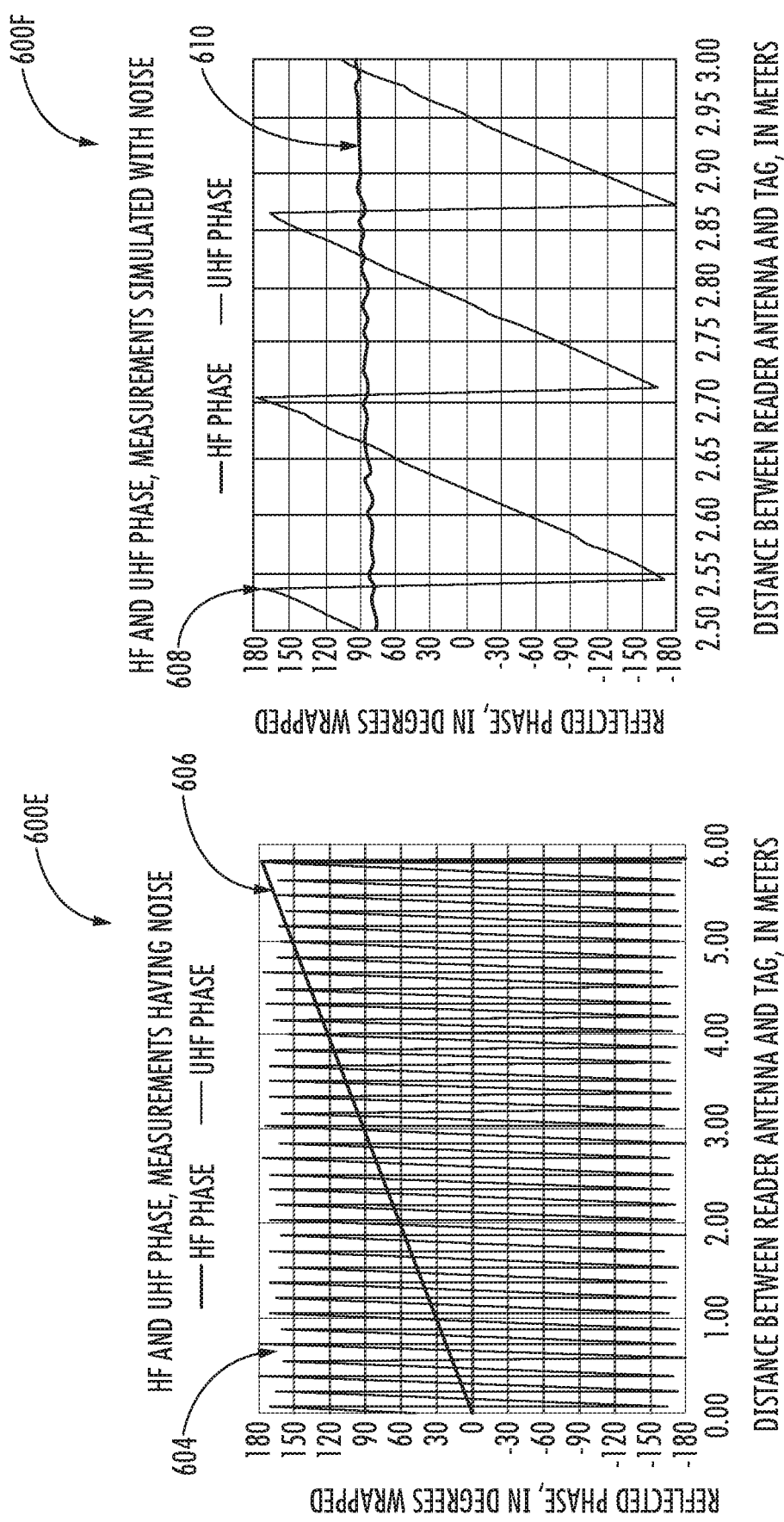

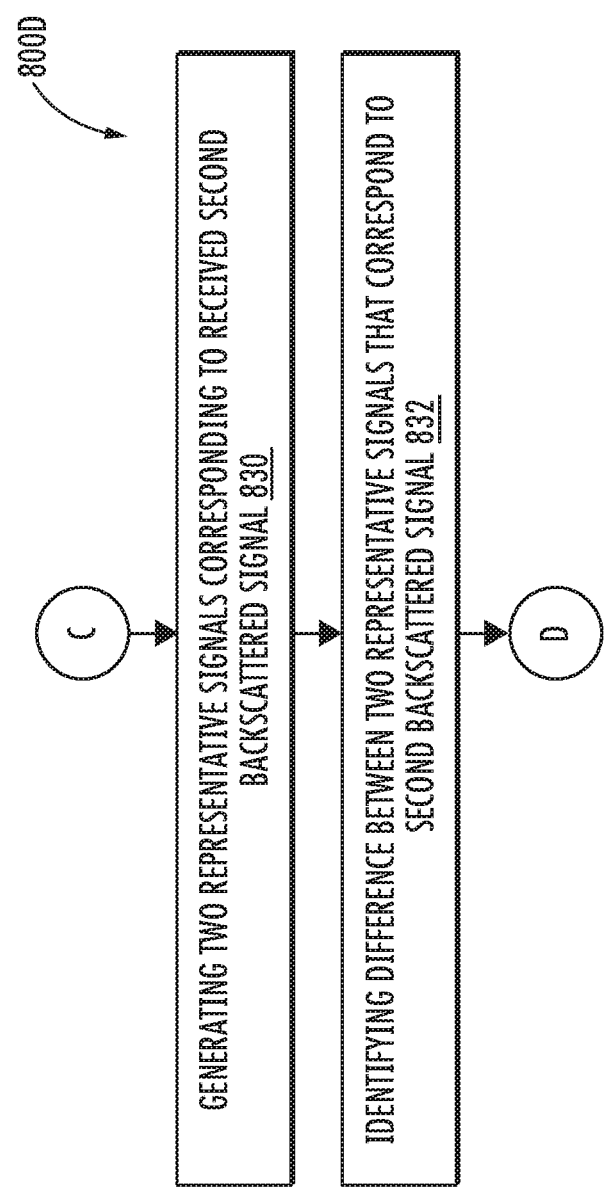

METHOD, SYSTEM AND APPARATUS FOR LOCATING RFID TAGS

TECHNOLOGICAL FIELD

Example embodiments of the present disclosure relate generally to radio frequency identification (RFID) systems, and, more particularly, to method, system and apparatus for locating RFID tags.

BACKGROUND

RFID (Radio Frequency Identification) is a radio frequency technology that may be utilized to acquire, store and manage all the necessary information related to an object attached to an RFID tag. RFID systems are massively used in a variety of application areas, such as identity management, access management, item tracking, and the like.

Applicant has identified a number of deficiencies and problems associated with conventional RFID systems. Through applied effort, ingenuity, and innovation, many of these identified problems have been solved by developing solutions that are included in embodiments of the present disclosure, many examples of which are described in detail herein.

BRIEF SUMMARY

A system and method for locating RFID tags are disclosed herein. An RFID reader system includes an RFID reader, a radio transceiver device, and a main control unit. The RFID reader may be configured to receive a first backscattered signal from an RFID tag in response to transmission of a first RF interrogation signal. The RFID reader may be further configured to determine a first phase angle of the received first backscattered signal. The radio transceiver device may be configured to receive a second backscattered signal from the RFID tag in response to transmission of a second RF interrogation signal, further, the transceiver device may be configured to determine a second phase angle of the received second backscattered signal. The main control unit, coupled to the RFID reader and the radio transceiver device, configured to determine a plurality of first distances between the RFID reader and the RFID tag based on the first phase angle determined by the RFID reader. The main control unit may be further configured to determine a second distance between the RFID reader and the RFID tag based on the second phase angle determined by the radio transceiver. Based on the determined second distance, the main control unit may be configured to select one of the plurality of first distances as a final distance between the RFID reader and the RFID tag. In some embodiments, the selected first distance is nearest to the determined second distance.

In some embodiments, the RFID reader may be operable at a high frequency band and the radio transceiver device may be operable at a low frequency band. Consequently, a first wavelength of the first RF interrogation signal is shorter than a second wavelength of the second RF interrogation signal.

In some embodiments, the transmission of the second RF interrogation signal may be simultaneous to the transmission of the first RF interrogation signal. In an alternative embodiment, the second RF interrogation signal and the first RF interrogation signal may be transmitted in time alternating manner. In some embodiments, the first backscattered signal and the second backscattered signal may be transmitted simultaneously by the RFID tag. In another embodiment, the first backscattered signal and the second backscattered signal may be transmitted at time-based intervals.

In some embodiments, the first RF interrogation signal and/or the second RF interrogation signal are configured to energize the RFID tag, wherein the energized RFID tag is utilized to power a first antenna structure and a second antenna structure through a feed terminal in the RFID tag.

In some embodiments, the tag antenna of the RFID tag may be tuned to be operable at different frequency bands. In another embodiment, the tag antenna of the RFID tag may include different sub-antennas, each sub-antenna being configured for a corresponding frequency band.

In some embodiments, the RFID tag from a plurality of RFID tags may include a tag antenna. The tag antenna may further include a first antenna structure, operable in a first frequency band, configured to generate the first backscattered signal based on the received first RF interrogation signal. Further a second antenna structure, operable in a second frequency band, may be configured to generate a second backscattered signal based on the received second RF interrogation signal. In some embodiments, the first antenna structure may be electromagnetically coupled to the second antenna structure. The first antenna structure may be configured to backscatter high frequency band signals and the second antenna structure may be configured to backscatter low frequency band signals.

In some embodiments, a tag antenna of the RFID tag comprises different sub-antennas, each sub-antenna being configured for a corresponding frequency band.

In some embodiments, the phase information of the second backscattered signal is unique at a distance up to half of wavelength of the second RF interrogation signal. In some embodiments, the RFID tag may be further configured to communicate information to the RFID reader via the first backscattered signal and/or the second backscattered signal.

In some embodiments, a first signal processor in the RFID reader may be configured to determine the first phase angle of the received first backscattered signal and transmit the determined first phase angle to the main control unit. In another embodiment, a second signal processor in the radio transceiver device is further configured to determine the second phase angle of the received second backscattered signal and transmit the determined second phase angle to the main control unit.

In some embodiments, the second signal processor in the radio transceiver device is further configured to determine the second phase angle of the received second backscattered signal; and transmit the determined second phase angle to the main control unit.

In some embodiments, the main control unit may be further configured to cause the determined final distance between the RFID reader system and the RFID tag to be displayed at a user interface on a display of the RFID reader system. In another embodiment, the main control unit is further configured to transmit the determined final distance between the RFID reader system and the RFID tag, through a communication network, to a remote processing device operable in a specific application area.

In some embodiments, a method for determining radio frequency identification (RFID) tag distance is provided. The method comprises receiving, by a RFID reader system, a first backscattered signal from an RFID tag in response to a transmission of a first radio frequency (RF) interrogation signal; and determining, by the RFID reader system, a first phase angle of the received first backscattered signal; receiving, by the RFID reader system, a second backscattered signal from the RFID tag in response to a transmission of a second RF interrogation signal; and determining, by the RFID reader system, a second phase angle of the received second backscattered signal; determining, by the RFID reader system, a plurality of first distances based on the first phase angle; determining, by the RFID reader system, a second distance based on the second phase angle; and determining, by the RFID reader system, a final distance between the RFID reader system and the RFID tag based on a selection of one of the plurality of first distances with respect to the determined second distance. In some embodiments, the method may further comprise determining a position of the RFID tag based on the determined final distance between the RFID reader system and the RFID tag. In an embodiment, the determined position of the RFID tag is unambiguous, unique, and precise due to an approximate distance that is determined based on the second phase angle of the received second backscattered signal, and a refined distance that is determined based on the first phase angle of the received first backscattered signal.

In some embodiments, the transmission of the second RF interrogation signal is simultaneous to the transmission of the first RF interrogation signal. In some embodiments, the transmission of the second RF interrogation signal is in time alternating manner with respect to the first RF interrogation signal.

In some embodiments, the selection of the one of the plurality of first distances is based on proximity to the determined second distance.

In some embodiments, the method further comprises causing the determined final distance between the RFID reader system and the RFID tag to be displayed at a user interface on a display of the RFID reader system.

In some embodiments, the method further comprises transmitting, through a communication network, the determined final distance between the RFID reader system and the RFID tag to a remote processing device operable in a specific application area.

The above summary is provided merely for purposes of summarizing some embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure according to one or more embodiments of the present disclosure are shown and described with respect to the figures presented herein, in which:

FIGS. 3A-3C illustrate different views of an RFID apparatus, according to one or more embodiments of the present disclosure described herein;

FIGS. 6E and 6F illustrate graphical representations of wrapped first phase angles and second phase angles, based on which the unique tag distance between an RFID reader system and an RFID tag is determined according to one or more embodiments of the present disclosure described herein;

FIGS. 8A-8D illustrate flowcharts describing operations of the RFID system for determining location information of the plurality of RFID tags, according to one or more embodiments of the present disclosure described herein.

DETAILED DESCRIPTION

Figure 1:
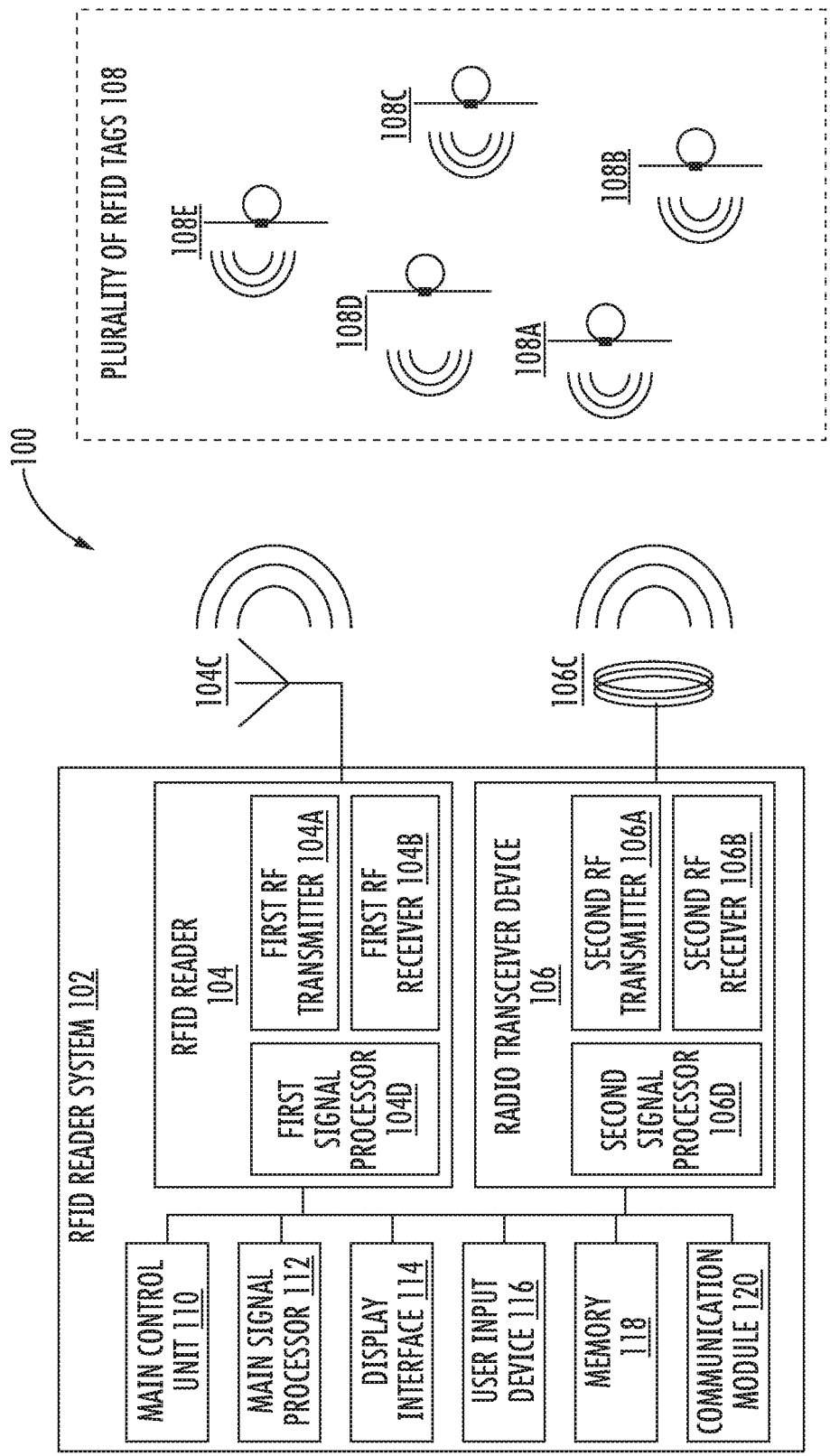
FIG. 1 illustrates a schematic block diagram of an RFID system, according to one or more embodiments of the present disclosure described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The words "example" and "exemplary" are used herein to mean "serving as an example, instance, or illustration." Any implementation described herein as "exemplary" or "example" is not necessarily to be construed as preferred or advantageous over other implementations.

If the specification states a component or feature "may," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

For the purposes of this description, a general reference to "memory" refers to memory accessible by the processors including internal memory or removable memory plugged into the device and memory within the processors themselves. For instance, memory may be any non-transitory computer readable medium having computer readable instructions (e.g., computer program instructions) stored thereof that are executable by a processor.

An RFID reader in the RFID system transmits interrogation signals in form of electromagnetic waves to hundreds and thousands of RFID tags disposed on respective objects located in a read zone. In response to the interrogation signals, the RFID tags perform backscattering modulation by modulating a magnitude and a phase of scattered electromagnetic wave of the electromagnetic waves transmitted from the RFID reader. The backscattered modulated electromagnetic waves, comprising information about corresponding RFID tags, are returned to the RFID reader. Accordingly, the RFID reader receives and processes information stored in the internal memory units of the respective RFID tags. If the RFID tag is a passive tag, the RFID tag also harvests energy from the interrogation signal from the RFID reader.

There are many types of RFID systems operating at different frequency bands, for example, 125 KHz-134 KHz, 13.56 MHz, 433 MHz, and 865 MHz-930 MHz. In lower frequency RFID systems (such as 125 KHz-134 KHz and 13.56 MHz), because the frequency of operation is low, the electric and magnetic fields are varying in-phase in the region between RFID tags and RFID antennas. The in-phase variation of the electric and magnetic fields in the region between RFID tags and RFID antennas provide suitable measurements for which locations of RFID tags may be determined. In high frequency RFID systems (such as 433 MHz and 865 MHz-930 MHz), because the frequency of operation is high and the distances between RFID tags and antennas are large with respect to the wavelength of the electromagnetic waves. However, the in-phase variation is exceptionally high, which does not provide a suitable base for measuring tag locations.

In certain scenarios, the RFID systems may be configured to determine locations of the RFID tags in addition to the identity of the RFID tags. Existing systems may implement a phase-based localization technique. However, existing phase-based localization techniques are not efficient because the wavelength is small (for example about 30 cm) at high frequency bands (for example, 915 MHz), and the phase of the received RFID tag signal rolls over −180/+180 degree each time the tag is moved half a wavelength towards or away from the RFID reader. In an example, considering the phase to be "unwrapped" (i.e. the phase extends well beyond the −180/+180 degree limits), the phase of lower frequency (such as HF) backscattered signals changes from 0 to 180 degrees over the distance range of 6 m. In contrast, the phase of higher frequency (such as UHF) backscattered signals extends beyond 12,000 degrees for the same distance range (6 m). Thus, the phase of the higher frequency backscattered signals changes more rapidly than the phase of the lower frequency backscattered signals over a given range of distance traversed by the RFID tag. Accordingly, locating a higher frequency RFID tag is a difficult problem as it is technically challenging to uniquely associate the received phase with the tag location.

In other words, one of the technical limitations in RFID reader systems configured for phase-based localization methods is that, at a high frequency band (for example, 915 MHz), the wavelength is small (for example about 30 cm), and the phase of the received RFID tag signal rolls over −180/+180 degree each time the tag is moved half a wavelength towards or away from the RFID reader.

To address these technical problems, the embodiments of the present application provide an RFID reader system that precisely locate multiple RFID tags. The proposed RFID reader system comprises an RFID reader (for example a UHF reader) and an additional low frequency (such as HF) transmitter/receiver (or transceiver) connected to the RFID reader. The RFID reader and the additional low frequency transmitter/receiver collectively interrogate a hybrid RFID tag at both high and low frequencies (i.e. UHF and HF) simultaneously. Thereafter, the RFID reader system measures backscatter signals (in both high and low frequency bands) generated by the hybrid RFID tag. Additionally, the high frequency (i.e. UHF) RF interrogation signals and the low frequency (i.e. HF) RF interrogation signals power up the hybrid RFID tag. The lower frequency backscatter signal is primarily used for locating and resolving the hybrid RFID tag, and the higher frequency backscatter signal is primarily used for data communication and, additionally, for refining the resolved (or approximated) location of the hybrid RFID tag. The proposed RFID system may be applicable in a variety of application areas, such as tracking automobiles, equipment, parts, components, tools or other assets in a manufacturing facility or assembling facility, or in a retail lot, warehouse, vehicle, cargo container, storage area, hospital, or other facility in which tracking of assets is required.

The proposed RFID system offers several technical advantages. The main advantage is to provide the location of a tag when hundreds, maybe even thousands of tagged objects are in the same area. In addition, such ability to resolve the location issues comes with little incremental cost. The RFID tag has a low cost and may use fully passive UHF and HF RFID tag IC technologies. The long UHF tag range is maintained, and the HF radio does not need to support any HF RFID protocol (it only measures the backscatter phase). Hence the complexity and cost are limited. Both UHF and HF reader antennas can be low-gain, making it easy to integrate them into handheld devices.

Having described example embodiments of the present disclosure generally, particular features and functionality of the various devices are hereinafter described.

The components illustrated in the figures represent components that may or may not be present in various embodiments of the disclosure described herein such that embodiments may include fewer or more components than those shown in the figures while not departing from the scope of the disclosure.

FIG. 1 illustrates a schematic block diagram of an RFID system 100, according to one or more embodiments of the present disclosure. As illustrated in FIG. 1, in an example embodiment, the schematic block diagram of the RFID system 100 may include an RFID reader system 102 and a plurality of RFID tags 108. Although FIG. 1 illustrates five RFID tags 108A-108E, the present disclosure contemplates that the plurality of RFID tags 108 may include any number of RFID tags, without deviation from the scope of the disclosure. The RFID reader system 102 may include an RFID reader 104 and a radio transceiver device 106. The RFID reader system 102 may further include a main control unit 110, a main signal processor 112, a display interface 114, a user input device 116, a memory 118, and a communication module 120. The RFID reader system 102 may include additional components as described further in FIG. 5.

In this regard, each component of the RFID system 100 may have one or more respective chipsets or hardware units. Such chipsets may operate based on a chipset specification, including parameters or operating conditions, throughout the description. In this regard, as described previously, the chipset specification may be accessible via interpretation or processing of software code containing hardware specific drivers, and other routines which drives operation for such chipsets. Additionally, the chipset specification may be indicative of, but not limited to, modes of operation, threshold values, or any other parameter that influence operations, functions, or performance associated with any of such chipsets.

As referred to herein, "module" or "unit" includes hardware, software and/or firmware configured to perform one or more specific functions. In this regard, the means of the circuitry of the RFID system 100, as described herein, may be embodied as, for example, circuitry, hardware elements (such as, a suitably programmed processor, combinational logic circuit, and/or the like), a computer program product comprising computer-readable program instructions stored on a non-transitory computer-readable medium that is executable by a suitably configured processing device, or some combination thereof.

In various embodiments, the RFID system 100 may be embodied as or form part of a handheld device, such as an RFID scanner, or a mobile computing device. The RFID system 100 may be implemented as, for example, an identity management system, an access management system, or an item tracking system (such as for automobiles, equipment, parts, components, tools or other assets), in a variety of facilities, such as, but not limited to, a manufacturing facility, an assembly facility, a retail lot, a warehouse, a cargo container, a storage area, a hospital, or other such facility. In some embodiments of the present disclosure, the RFID system 100 may be configured to determine a precise and unique location of the plurality of RFID tags 108 by using low frequency bands for approximately ranging (locating) the plurality of RFID tags 108 and high frequency bands for resolving/refining the approximated ranging or location of the plurality of RFID tags. The high frequency bands further energize the plurality of RFID tags 108 and allows the devices with low frequency bands to enhance ranging capabilities and operate beyond the corresponding range. Consequently, the plurality of RFID tags 108 may be constantly energized, unique tag locations may be determined, and the devices with low frequency bands may receive RF tag signals from further distances that are beyond the corresponding ranges.

The RFID reader system 102 in the RFID system 100 may be configured to operate in two modes of RF communication. The first communication mode corresponds to far-field communication mode and the second communication mode corresponds to near-field communication mode with respect to the plurality of RFID tags 108. In some embodiments, the RFID reader system 102 may be configured to operate in the two modes of RF communication based on simultaneous transmission/reception of RF signals at different frequency bands. In an alternative embodiment, the RFID reader system 102 may be configured to operate in two modes of RF communication based on time alternating transmission/reception of RF signals at different frequency bands.

The RFID reader system 102, that includes the RFID reader 104 and the radio transceiver device 106, may be triggered upon an actuation or an input provided by a user. Once triggered, the RFID reader system 102 may be configured to transmit information to the plurality of RFID tags 108 by modulating RF signal in the different frequency bands, including a higher frequency band (corresponding to the RFID reader 104 operating at 915 MHz (UHF)) and a lower frequency band (corresponding to the radio transceiver device 106 operating at 13.6 MHz (HF) or 530-1710 KHz (NFER)). Such information may be transmitted as RF interrogation signals in response to triggering of the RFID reader system 102 to interrogate and determine identities and locations of each of the plurality of RFID tags 108. In various embodiments, the RFID reader system 102 may interrogate the plurality of RFID tags 108 using various commands, such as a select command to select a specific RFID tag group for subsequent inventory round based on user-specified criteria, or an inventory command to single out one or more individual tags from the plurality of RFID tags 108, and the like. Such RF interrogation signals further provide operating energy (as continuous wave RF signals) to the plurality of RFID tags 108. The continuous wave may refer to a waveform transmitted by an RFID reading device and suitable to power a passive RFID tag, e.g., a sinusoid at a given frequency.

In various embodiments, the RFID reader system 102 may communicate with the plurality of RFID tags 108 using a combination of one or more reader antennas, thus referred to as multiple antenna, multiple tags (MAMT) system. Based on the number of tags placed on one or more objects and the number of reader antennas the RFID reader system 102, the MAMT system may be reduced to one or more sub-systems, such as a single antenna, multiple tag (SAMT) system, a multiple antenna, single tag (MAST) system, or a single antenna, single tag (SAST) system.

In various embodiments, the RFID reader system 102 may be configured to transmit information to the plurality of RFID tags 108 by modulating an RF carrier using various keying technologies, such as double-sideband amplitude shift keying (DSB-ASK), single-sideband amplitude shift keying (DSB-ASK), or phase-reversal amplitude shift-keying (PR-ASK) using a pulse-interval encoding (PIE) format. The RFID reader system 102 may be configured to use various access commands for communicating with each of the plurality of RFID tags 108, as described below.

In some embodiments, for example, the RFID reader system 102 supports both for EPC™ Class-1 Generation-2 protocol of the UHF band, and 13.56 MHz RFID protocols of ISO14443 A/B type, and ISO15693 standards. Although this example uses aforesaid standards for UHF and HF bands, the present disclosure contemplates that other standards of mutually contrast frequency bands may also be supported, without deviation from the scope of the disclosure The RFID reader 104 may include a first RF transmitter 104A, a first RF receiver 104B, a first antenna 104C, and a first signal processor 104D. The first RF transmitter 104A and the first RF receiver 104B may be electrically coupled to the first antenna 104C. It should be noted that although the first antenna 104C is illustrated as being configured to switch between transmission and reception of RF interrogation signals and backscattered signals respectively, the RFID reader 104 can include additional separate transmit or receive antennas that may be arranged in an array, which may be symmetrical or asymmetrical with respect to each other. For example, the receive antennas may be arranged in, for example, a rectangular array configuration or aligned to form arrays with different sizes and shapes, as desired or needed, such as based on the plurality of RFID tags 108 to be interrogated. The first RF transmitter 104A and the first RF receiver 104B may be selectively turned on and off to communicate with the plurality of RFID tags 108 to transmit the first interrogation RF signals and acquire RFID tag location information, which then may, for example, provide the user with information about location of each of the plurality of RFID tags 108, as described in more detail herein.

The RFID reader 104 may be configured to transmit a first RF interrogation signal to an RFID tag, such as the first RFID tag 108A of the plurality of RFID tags 108, through the first RF transmitter 104A and the first antenna 104C. The first RF receiver 104B may further include various components, such as, but not limited to, filters, amplifiers, analog to digital convertor, and tuners (not shown in FIG. 1). The RFID reader 104 may be configured to generate the first RF interrogation signal by modulating a first RF signal having a predetermined carrier frequency with lower wavelength. The RFID reader 104 may be configured to operate in the first communication mode, which is far-field communication mode based on electromagnetic coupling between the RFID reader 104 and the first RFID tag 108A. In the first communication mode, the first antenna 104C, such as a dipole antenna, may be attached to the RFID reader 104 that transmits the electromagnetic waves to the first RFID tag 108A. Consequently, a dipole antenna in the first RFID tag 108A may receive energy as an alternating potential difference that appears in the midst of the dipole. The rectification of the potential and linking it to another capacitor results in the accumulation of the energy in the first RFID tag 108A.

In some embodiments, the RFID reader 104 may be an RFID reader that operates on higher frequency bands, such as UHF bands. The first RF interrogation signal generated at the first RF transmitter 104A of the RFID reader 104 may be externally transmitted to the plurality of RFID tags 108 in form of electromagnetic waves, via the first antenna 104C. Also, the RFID reader 104 may receive the first backscattered signal from the first RFID tag 108A, via the first antenna 104C and the first RF receiver 104B. The RFID reader 104 may be further configured to read and/or modify memory units of the plurality of RFID tags 108 containing encoded messages.

As shown in FIG. 1, the first antenna 104C in the RFID reader 104 is a single antenna. However, it may be contemplated that the RFID reader 104 may comprise more than one antenna, without deviating from the scope of the disclosure. In such cases, the RFID reader 104 further comprises a multiplexing circuit (not shown) that may be configured to electrically couple each antenna to the RFID reader 104. In one embodiment, the multiplexing circuit may be configured to alternatively couple each antenna to the RFID reader 104 by implementing a time division technology, so that during a given time slot, no more than one antenna of the plurality of antennas is coupled to the RFID reader 104. In another embodiment, the multiplexing circuit can be configured to couple each antenna to the RFID reader 104 by implementing a frequency division technology, as described in details herein infra.

In some embodiments, the RFID reader 104 and the main control unit 110 may communicate with each other based on the Universal Asynchronous Receiver Transmitter (UART) transmission protocol. In such transmission protocol, separate data lines may be utilized for transmitting and receiving data.

Various embodiments of the RFID reader 104 may be used in a numerous application areas, including but not limited to, item tracking in manufacturing and retail stores, real-time inventory control systems, warehouse facilities, packages in shipping consignments, and the like.

The radio transceiver device 106 in the RFID reader system 102 may be configured to transmit a second RF interrogation signal to an RFID tag, such as the first RFID tag 108A of the plurality of RFID tags 108, configured to be operable with the radio transceiver device 106 in the second communication mode. The radio transceiver device 106 may be operable at a lower frequency band that corresponds to the HF band in some embodiments. The radio transceiver device 106 may be configured to operate in the second communication mode, which is a near-field communication mode based on inductive coupling between the radio transceiver device 106 and the first RFID tag 108A. In the second communication mode, the second antenna 106C, such as a planar, circular polarized antenna, may be attached to the radio transceiver device 106 to emit a magnetic field due to passage of high alternating current through a reading coil. If the plurality of RFID tags 108 with small coils are placed in a field, an alternating voltage appear against such small coils of each of the plurality of RFID tags 108. If the voltage is rectified and coupled with a capacitor, then the charge gets accumulated at the plurality of RFID tags 108 and the information is communicated. In the second communication mode, the strength of the magnetic field drops sharply with distance of the plurality of RFID tags 108 from the radio transceiver device 106.

The radio transceiver device 106 may include a second RF transmitter 106A, a second RF receiver 106B, and a second antenna 106C. The second RF transmitter 106A and the second RF receiver 106B may be electrically coupled to the second antenna 106C. The second RF receiver 106B may further include various components, such as, but not limited to, filters, amplifiers, analog to digital convertor, and tuners (not shown in FIG. 1). The radio transceiver device 106 may be configured to transmit a second RF interrogation signal to the first RFID tag 108A through the second RF transmitter 106A and the second antenna 106C. The radio transceiver device 106 may be configured to generate the second RF interrogation signal by modulating an RF signal having a predetermined carrier frequency with higher wavelength. In some embodiments, the radio transceiver device 106 is another RFID reader which operates on lower frequency bands, such as LF bands, HF bands or 1 MHz bands. The second RF interrogation signal generated at the second RF transmitter 106A of the radio transceiver device 106 may be externally transmitted to each of the plurality of RFID tags 108 in form of an electromagnetic wave through the second antenna 106C. Also, the radio transceiver device 106 may receive the second backscattered signals from the plurality of RFID tags 108 through the second antenna 106C and the second RF receiver 106B.

In some embodiments, the radio transceiver device 106 may be compliant with Near-Field Electromagnetic Ranging (NFER®) technology operating at low frequencies, typically within the AM broadcast band (530-1710 kHz) exploiting the near-field behavior of radio signals within about one-third of a wavelength.

In some embodiments, the radio transceiver device 106 may utilize I²C (Inter-Integrated Circuit) synchronous protocol that may use only two wires, one for the clock and other for the data. Thus, the main control unit 110 and the radio transceiver device 106 may transmit data over the same wire.

The plurality of RFID tags 108 may respond to the second RF interrogation signal by modulating the reflection coefficient of corresponding antennas, thus generate backscattered signal to the RFID reader system 102. The RFID reader system 102 may determine precise locations and identities of the plurality of RFID tags 108 based on the backscattered signal. The RFID reader system 102 may be configured to establish isolated communication with each of the plurality of RFID tags 108 such that RF signal collision is prevented.

In response to receiving RF interrogation signals (at higher and lower frequencies) from the RFID reader system 102, each of the plurality of RFID tags 108 may be configured to transmit response RF signals (for example a first backscattered signal and a second backscattered signal corresponding to both the RF interrogation signals at higher and lower frequencies, respectively) back to the RFID reader system 102. The first backscattered signal and the second backscattered signal may include useful data, such as an Electronic Product Code (EPC) identifier or a tag identifier (TID). The response signal may include a representation of a binary string, at least part of which is equal to at least part of the specified one or more TIDs. Each of the plurality of RFID tags 108 may store corresponding tag identifier in corresponding memory units. In some embodiments, each of the plurality of RFID tags 108 may be attached to a corresponding inventory object and may further store a product code, the EPC code, and/or at least one alphanumeric string identifying the corresponding inventory object. In some embodiments, one or more of the plurality of RFID tags 108 may be configured to transmit the first backscattered signal and the second backscattered signal simultaneously to the RFID reader system 102. In an alternate embodiment, one or more of the plurality of RFID tags 108 may be configured to transmit the first backscattered signal and the second backscattered signal in time alternating manner to the RFID reader system 102.

The RFID reader 104 of the RFID reader system 102 utilizes a first phase angle of the first backscattered signal to determine a first plurality of tag distances, i.e. the candidate distances. The radio transceiver device 106 of the RFID reader system 102 utilizes a second phase angle of the second backscattered signal to determine a second tag distance, i.e. an approximated distance. Final tag distance may be determined by the RFID reader system 102 based on a candidate first tag distance that is nearest to the approximated second tag distance. Thus, while such one or more RFID tags exhibit long range (as expected from high frequency band RFID tags (for example of the order of 10 m for UHF RFID tags)), the tag distance (determined by the RFID reader system 102 using phase angle of low frequency band backscattered RF signals) is unique at distances up to half wavelength (for example, 11 m for 13.56 Mhz for HF RFID tags), which is the maximum practical range for high frequency band RFID tags (for example, UHF RFID tags).

In some embodiments, each of the plurality of RFID tags 108 may be a passive RFID tag configured to harvest energy from one of the first RF interrogation signal or the second RF interrogation signal received from the RFID reader system 102 using tag antenna. The harvested energy may be utilized to power a first antenna structure and a second antenna structure through a feed terminal in a corresponding RFID tag, as described in FIG. 2. The first antenna structure, configured to backscatter the high frequency band signals, may be electromagnetically coupled to the second antenna structure, configured to backscatter the low frequency band signals. In some embodiments, the tag antenna of each of the plurality of RFID tags 108 may be tuned to be operable at different frequency bands. In other embodiment, the tag antenna of each of the plurality of RFID tags 108 may comprise different sub-antennas. Each sub-antenna may be configured for a corresponding frequency band separately.

The main control unit 110 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although described herein with reference to a single controller in an example embodiment, the present disclosure contemplates that the main control unit 110 may include a plurality of processors and signal processing modules, without deviation from the scope of the disclosure. The plurality of processors may be in operative communication with each other and may be collectively configured to perform one or more functionalities of the circuitry of the RFID system 100, as described herein. In an example embodiment, the main control unit 110 may be configured to execute instructions stored in a host device (not shown) or otherwise accessible to the main control unit 110. These instructions, when executed by the main control unit 110, may cause the circuitry of the RFID system 100 to perform one or more of the functionalities, as described herein.

Whether configured by hardware, firmware/software methods, or by a combination thereof, the main control unit 110 may include an entity capable of performing operations according to embodiments of the present disclosure while configured accordingly. Thus, for example, when the main control unit 110 is embodied as an ASIC, FPGA or the like, the main control unit 110 may include specifically configured hardware for conducting one or more operations described herein. Alternatively, in another example, when the main control unit 110 is embodied as an executor of instructions retrieved from the local memory of the host device, the instructions may specifically configure the main control unit 110 to perform one or more algorithms and operations described herein.

Thus, the main control unit 110 used herein may refer to a programmable microprocessor, microcomputer, or multiple processor chip(s) that can be configured by software instructions (applications) to perform a variety of functions, including the functions of the various embodiments described above. In some devices, multiple processors may be provided and are dedicated to wireless communication functions, and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The main control unit 110 may be electrically coupled to the RFID reader 104 and the radio transceiver device 106 in the RFID reader system 102. Any type of communicative or operative coupling, such as any type of wireless or wired communication coupling, may be used. The main control unit 110 may be configured to control the operation of the RFID reader system 102, such as to control the transmissions by the first RF transmitter 104A and/or second RF transmitter 106A and the reception by the first RF receiver 104B and/or the second RF receiver 106B. In one embodiment, the main control unit 110 may be a transmit and receive controller configured to control the RF pulses sent to the first RF transmitter 104A and/or the second RF transmitter 106A and the communication of signals received by the first RF receiver 104B and/or second RF receiver 106B. However, as described in more detail herein, the main control unit 110 may also be configured to control other components of the RFID system 100.

The main signal processor 112, coupled to the main control unit 110 in the RFID system 100, may be configured to control the operation of the main control unit 110 to transmit and receive RF signals, as desired or needed. The main signal processor 112 may also be configured in various embodiments to process received RF signals, such as backscattered signals, with corresponding phase information that may be used to determine the locations of the plurality of RFID tags 108, as described herein. For example, in some embodiments, the main signal processor 112 may be configured to determine the position, orientation, size and/or movement of the plurality of RFID tags 108 (each of which may be coupled to corresponding object or item) using the measurement of the phase angles of the first backscattered signal and the second backscattered signal received at the first RF receiver 104B and/or the second RF receiver 106B, and phase differentials as a function of distance, frequency, and time as the basis of the spatial identification, as described herein.

The display interface 114 may include suitable logic, circuitry, interfaces, and/or code that may be configured to, under the control of the main control unit 110, provide an indication of a tag distance of an RFID tag, such as the first RFID tag 108A, as described in accordance with flowcharts 800A-800D of FIGS. 8A-8D, respectively. For example, the display interface 114 may display location information of one or more of the plurality of RFID tags 108 associated with one or more objects in a display area. The one or more of the plurality of RFID tags 108 associated with the one or more objects may be specified in a search request from a user. In some embodiments, the display interface 114 may allow a graphical navigation to the user to locate a plurality of objects associated with the plurality of RFID tags 108 by displaying location information of the plurality of RFID tags 108 associated with the plurality of objects.

The user input device 116 may include suitable logic, circuitry, interfaces, and/or code that may be configured to receive input from the user handling the RFID reader system 102. Various examples of the user input device 116 may include, but not limited to, a keyboard, a mouse, a touchpad, or other actuation means that provides a trigger or an actuation to activate the RFID reader system 102. In some embodiments, the display interface 114 and the user input device 116 are separate devices and coupled to the main control unit 110 to allow a user to interact with the RFID system 100. In another embodiment, the display interface 114 and the user input device 116 may be integrated, such as in touch screens, and coupled to the main control unit 110 to allow the user to interact with the RFID system 100.

The memory 118 may include, for example, volatile memory, non-volatile memory, or some combination thereof. Although illustrated in FIG. 1 as a single memory, the memory 118 may include a plurality of memory components. The plurality of memory components may be embodied on a single electronic device or distributed across a plurality of electronic devices. In various embodiments, the memory 118 may include, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. The memory 118 may be configured to store instructions and/or applications for enabling the circuitry of the RFID reader system 102 to carry out various functions in accordance with example embodiments of the present disclosure. For example, in at least some embodiments, the memory 118 may be configured to buffer the distances of the plurality of RFID tags 108 determined by the main signal processor 112. Additionally, or alternatively, in at least some embodiments, the memory 118 may be configured to store program instructions and/or application programs related to various signal processing algorithms for execution by the main signal processor 112. The memory 118 may store information in the form of static and/or dynamic information. This information may be stored and/or used by the circuitry of the RFID reader system 102 to perform various functionalities as described herein.

The memory 118 may be any type of electronic storage device, and can be coupled to the main signal processor 112 (or form part of the main signal processor 112). The main signal processor 112 may access the memory 118 to obtain stored image information that is correlated with acquired phase information for the plurality of RFID tags 108 (such as with time-stamping) and used to aid or facilitate locating the plurality of RFID tags 108 (such as presenting the user with location information to help more easily identify the physical location of the plurality of RFID tags 108).

The communication module 120 may be embodied as an interface, device, or means embodied in circuitry, hardware, a computer program product including computer readable program instructions stored on a computer readable medium (e.g., the memory 118) and executed by a processing device (e.g., the main control unit 110 and/or the main signal processor 112), or any combination thereof that is configured to receive/transmit data from/to another device, system, and/or network. In an example embodiment, the communication module 120 (like other components discussed herein) may be at least partially embodied as or otherwise controlled by the main control unit 110 and/or the main signal processor 112. In this regard, the communication module 120 may be in communication with the main control unit 110 and/or the main signal processor 112, such as via a bus. The communication module 120 may include, for example, an antenna, a transmitter, a receiver, a transceiver, a network interface card, and/or supporting hardware and/or firmware/software to enable communication with another electronic device. The communication module 120 may be configured to receive and/or transmit signals and/or data that may be stored by the memory 118 by use of a protocol for communication between various electronic devices. The communication module 120 may additionally or alternatively be in communication with the memory 118 and/or any other component of the circuitry of the RFID reader system 102, via a means, such as a bus. In various embodiments, wireless communication interface of the communication module 120 may be configured to support, for example, but not limited to, various protocols, such as IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

It may be noted that all or some of the information presented by the examples discussed herein may be based on data that is received, generated and/or maintained by one or more components of a local or networked system and/or the circuitry of the RFID system 100. In an example embodiment, one or more external systems (such as a remote cloud computing and/or data storage system) may also be leveraged to provide at least some of the functionality discussed herein.

As described above and as will be appreciated that, based on this disclosure, embodiments of the present disclosure may be configured as methods, personal computers, servers, mobile devices, backend network devices, and the like. Accordingly, embodiments may include various means comprised entirely of hardware or any combination of software and hardware. Furthermore, embodiments may take the form of a computer program product on at least one non-transitory computer-readable storage medium having computer-readable program instructions (such as, computer software) embodied in the storage medium. Any suitable computer-readable storage medium may be utilized including non-transitory hard disks, CD-ROMs, flash memory, optical storage devices, or magnetic storage devices.

These computer program instructions may also be stored in a computer-readable storage device (such as, the memory 118) that may direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Figure 2:
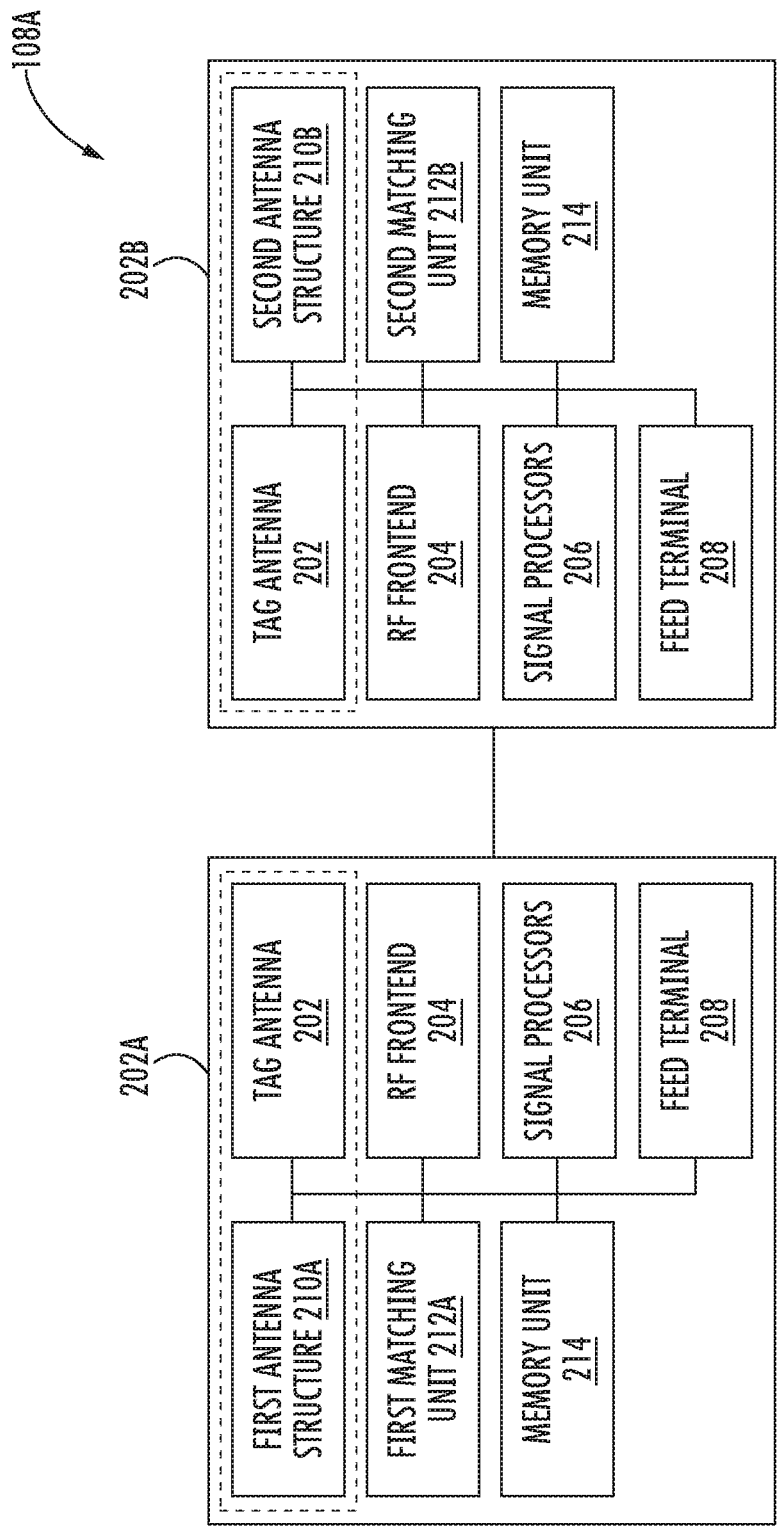
FIG. 2 illustrates a component diagram of a dual-band tag antenna of one of a plurality of RFID tags in the RFID system, according to one or more embodiments of the present disclosure described herein.

FIG. 2 illustrates a component diagram of a dual-band tag antenna of one of the plurality of RFID tags 108 (for example, the first RFID tag 108A) in the RFID system 100, according to one or more embodiments of the present disclosure. In some embodiments, the first RFID tag 108A may be tuned for two different frequency bands, for example both HF (13.56 MHz) and UHF (915 MHz) bands, and accordingly may generate modulated backscatter signals at different frequencies, i.e. HF and UHF, that the first RFID tag 108A is interrogated at.

With reference to FIG. 2, a component diagram of the dual-band tag antenna of the first RFID tag 108A is shown. The dual-band tag antenna includes an RFID tag antenna 202, an RF frontend 204, signal processors 206, a feed terminal 208, a first antenna structure 210A, a second antenna structure 210B, a first matching unit 212A, a second matching unit 212B, and a memory unit 214. In some embodiments, the RFID tag antenna 202 comprises a first sub-antenna that corresponds to the first antenna structure 210A operable at a first frequency, and a second sub-antenna that corresponds to the second antenna structure 210B operable at a second frequency.

The RFID tag antenna 202 may be configured to receive electromagnetic waves (or the first RF interrogation signal and the second RF interrogation signal) from the RFID reader 104 and the radio transceiver device 106. The RFID tag antenna 202 may receive the received electromagnetic waves at the RF frontend 204. When magnitude of the first RF interrogation signal and the second RF interrogation signal communicated to the RF frontend 204 are greater than or equal to a minimum threshold power required for operation of the first RFID tag 108A, the first RFID tag 108A may respond to the interrogation signals of the RFID reader 104 and the radio transceiver device 106 by performing backscattering modulation of the electromagnetic waves transmitted by the RFID reader 104 and the radio transceiver device 106.

The RF frontend 204 may include various electronic and electrical components, such as, but not limited to, rectifier, modulator demodulator, charge pumps, regulator, and a power on reset (POR), not shown in FIG. 2 for brevity. For the received first and second RF interrogation signals in different frequency bands, the RF frontend 204 may be configured to convert the received RF signals to direct current (DC) voltage. Thus, the RF frontend 204 may be configured to harvest energy from the received RF interrogation signals in different frequency bands and supply the harvested energy to the signal processors 206 for further operations. The RF frontend 204 may be further configured to extract a baseband signal from the received RF interrogation signals.

In some embodiments, the RFID tag antenna 202 includes two sub-antennae that correspond to two different structures, such as the first antenna structure 210A and the second antenna structure 210B, serving the lower and the higher frequency bands. As illustrated in FIG. 2, the RFID tag antenna 202 may include a substrate including a first surface 202A and a second surface 202B, and a feed terminal 208. The first surface 202A includes a first matching unit 212A, and the second surface 202B includes a second matching unit 212B.

The substrate may form the first antenna structure 210A on the first surface 202A (which may be a top surface) and the second antenna structure 210B on the second surface 202B (which may be a bottom surface). The substrate may be a printed circuit board (PCB), and other such means to transfer an electrical signal through a copper circuit or a thin film optical circuit.

The first antenna structure 210A may be electrically connected to the second antenna structure 210B through electromagnetic coupling. The first antenna structure 210A may form a structure of a shape, such as circular or rectangular, which is similar to the shape of the second antenna structure 210B. The first antenna structure 210A may work on a higher frequency band, such as UHF, and the second antenna structure 210B may work on a lower frequency band, such as HF. Also, the first antenna structure 210A may perform conjugate matching with respect to impedance of the RF frontend 204 so that the first antenna structure 210A may transfer the RF signal to the RF frontend 204 while minimizing loss. The feed terminal 208 may supply power to each of the first antenna structure 210A and the second antenna structure 210B.

The RFID tag antenna 202 may be further coupled with the first matching unit 212A to determine the impedance of the first antenna structure 210A by adjusting at least one of a length and a width of a feed loop that connects the first antenna structure 210A and the feed terminal 208. The first matching unit 212A may include a first slot to adjust the length of the feed loop and a second slot to adjust the width of the feed loop. At least one of the first slot and the second slot may be detachably attached to the feed loop. Also, the first matching unit 212A may further include a third slot to adjust the length of the first antenna structure 210A. Accordingly, when the impedance of the first antenna structure 210A and the impedance of the second antenna structure 210B satisfy a predetermined condition, the third slot may be detachably attached to the first antenna structure 210A to have a length corresponding to an operating frequency. The first matching unit 212A may determine a reactance component in the impedance of the first antenna structure 210A based on the length of the feed loop. Depending on embodiments, the first matching unit 212A may determine a resistance component in the impedance of the first antenna structure 210A based on the length of the feed loop and the width of the feed loop.

The RFID tag antenna 202 may further include the second matching unit 212B to determine the impedance of the second antenna structure 210B by adjusting at least one of the number of turns of the second antenna structure 210B and an LC resonance value by a capacitor.

The memory unit 214 of the passive first RFID tag 108A (for example, the UHF EPC Gen 2 standard) may further include, for example, a reserved memory, an EPC memory, a TID memory, and/or a user memory. The reserved memory stores a kill password that disables the RFID tag, and an access password that is set to lock and unlock the write capabilities of the RFID tag. The EPC memory stores the electronic product code. It has a minimum of 96 bits of writable memory. The EPC memory is the first writable memory bank in the RFID tag. The TID memory is used to store the unique tag ID number by the manufacturer when the RFID tag is manufactured. The user memory may be an extended memory which can store more information. The storage capacity of the memory unit 214 of the passive first RFID tag 108A may be between 64 bits to 1 kilobyte of non-volatile memory. The memory unit 214 may use EEPROM memory and laser programmed at the silicon level.

FIGS. 3A-3C illustrate different views of an RFID apparatus 300, according to one or more embodiments of the present disclosure. The RFID Reader System 102, as described above in FIG. 1, may be embodied as part of the RFID apparatus 300. The RFID apparatus 300 is shown in FIGS. 3A (front panel view), 3B (oblique panel view) and 3C (bottom panel view). The RFID apparatus 300 may include a housing 302 within which other components of the RFID reader system 102 may be disposed. An LCD touch screen (with touch screen sensors) 306 can be disposed on a front panel 308. Also disposed on the front panel 308 may be an operation LED 304, a scan LED 310, and a keyboard 312 including a scan key 314 and navigation keys 316. An imaging window 318 may be disposed on the top panel of the housing 302. Disposed on the side panel (as shown in FIG. 3B) may be an infrared communication port 320, an access door to a secure digital (SD) memory interface 322, an audio jack 324, and a hand strap 326. Disposed on the bottom panel (as shown in FIG. 3C) may be a multi-pin mechanical connector 328 and a hand strap clip 330.

In some embodiments, the imaging window 318 allows an imaging system within the housing 302 to be behind the imaging window 318 for protection to have a field of view in front of the RFID apparatus 300. In some embodiments, an illuminator (not shown) may also be disposed within the housing 302 behind the protective imaging window 318 in a cooperative manner with the camera system. In one embodiment, the imaging window 318 may include a fisheye lens or other lens to provide a panoramic or wider view to ensure that a camera may capture images of, for example, the region of interest. Also, disposed on the bottom panel (or alternatively on the top panel) is an RFID antenna housing and an RFID reader system 102 (which may include the first RF transmitter 104A, the second RF transmitter 106A, the first RF receiver 104B, and the second RF receiver 106B shown in FIG. 1) within the housing 302.

Figure 4:
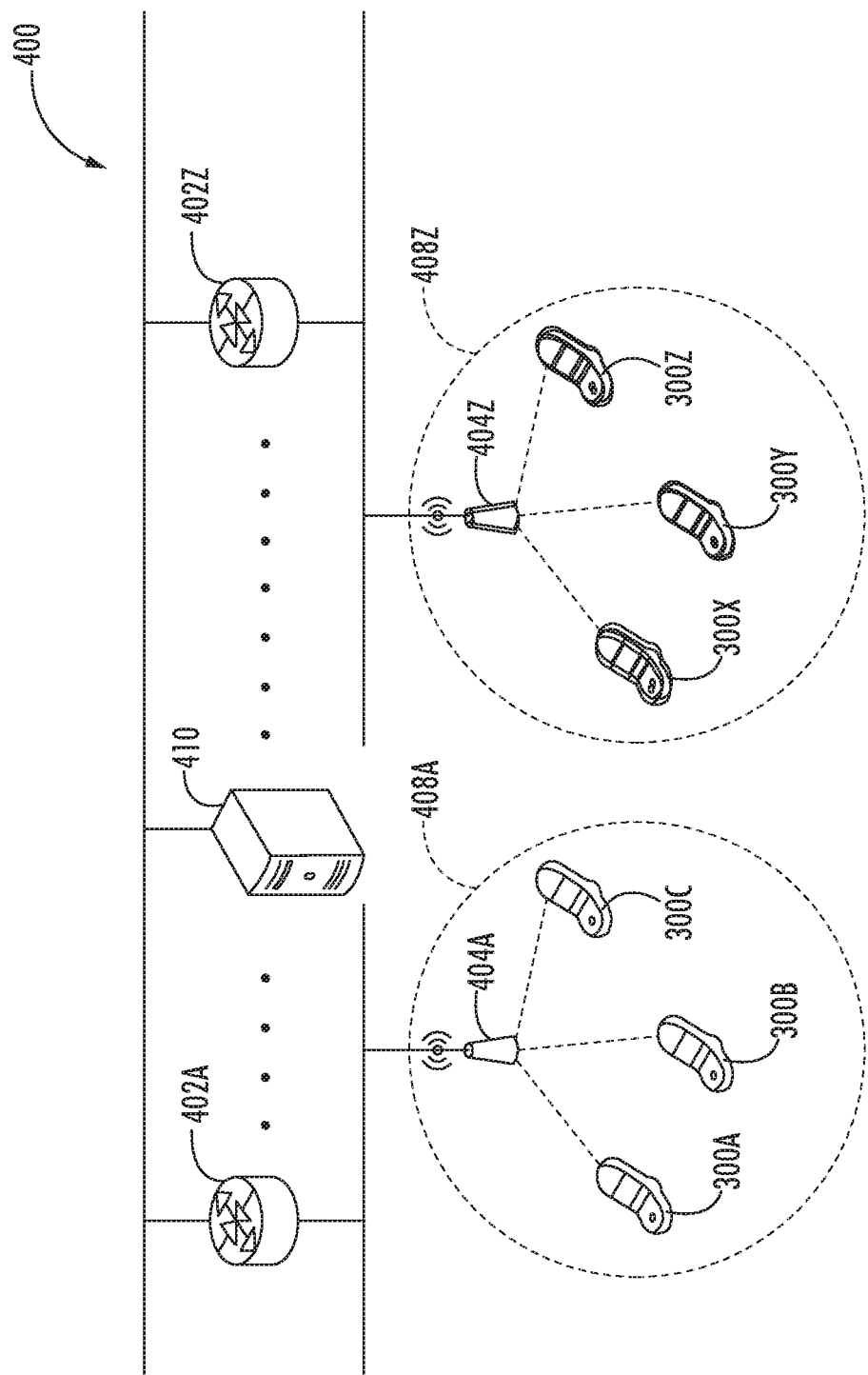
FIG. 4 illustrates a data collection system including an RFID system, according to one or more embodiments of the present disclosure described herein.

FIG. 4 illustrates a data collection system within which a RFID system may operate (such as the RFID system 100 of FIG. 1), according to one or more embodiments of the present disclosure. In some embodiments, the RFID system 100 and/or the RFID apparatus 300 may be incorporated in the data collection system 400. The data collection system 400 may include a plurality of routers 402A-402Z, a plurality of access points 404A-404Z, and a plurality of RFID apparatuses 300A-300Z in communication within a plurality of interconnected networks 408A-408Z. In some embodiments, the plurality of networks 408A-408Z may include at least one wireless communication network. In various embodiments, each of the plurality of RFID apparatuses 300A-300Z may include a communication interface, such as the communication module 120, for connecting to the one or more of the plurality of interconnected networks 408A-408Z. In one embodiment, the communication module 120 may be provided by a wireless communication interface.

One or more of the plurality of RFID apparatuses 300A-300Z may establish communication with a host computer 410. In one embodiment, network frames may be exchanged by the one or more of the plurality of RFID apparatuses 300A-300Z and the host computer 410 via one or more of the plurality of routers 402A-402Z, base stations, and other infrastructure elements (not shown). In another embodiment, the host computer 410 may communicate with the one or more of the plurality of RFID apparatuses 300A-300Z via a corresponding network, such as a local area network (LAN). In yet another embodiment, the host computer 410 may communicate with the one or more of the plurality of RFID apparatuses 300A-300Z via a corresponding network, such as a wide area network (WAN). The present disclosure should not be contemplated as limiting and other methods of providing interconnectivity between the one or more of the plurality of RFID apparatuses 300A-300Z and the host computer 410 relying upon LANs, WANs, virtual private networks (VPNs), and/or other types of network are within the scope of this disclosure.

In some embodiments, the communications between the one or more of the plurality of RFID apparatuses 300A-300Z and the host computer 410 may include a series of HTTP requests and responses transmitted over one or more TCP connections. In one embodiment, the communications between the one or more of the plurality of RFID apparatuses 300A-300Z and the host computer 410 may include VoIP traffic transmitted over one or more TCP and/or UDP ports. The present disclosure should not be contemplated as limiting and other transport and application level protocols is within the scope of this disclosure.

Figure 5:
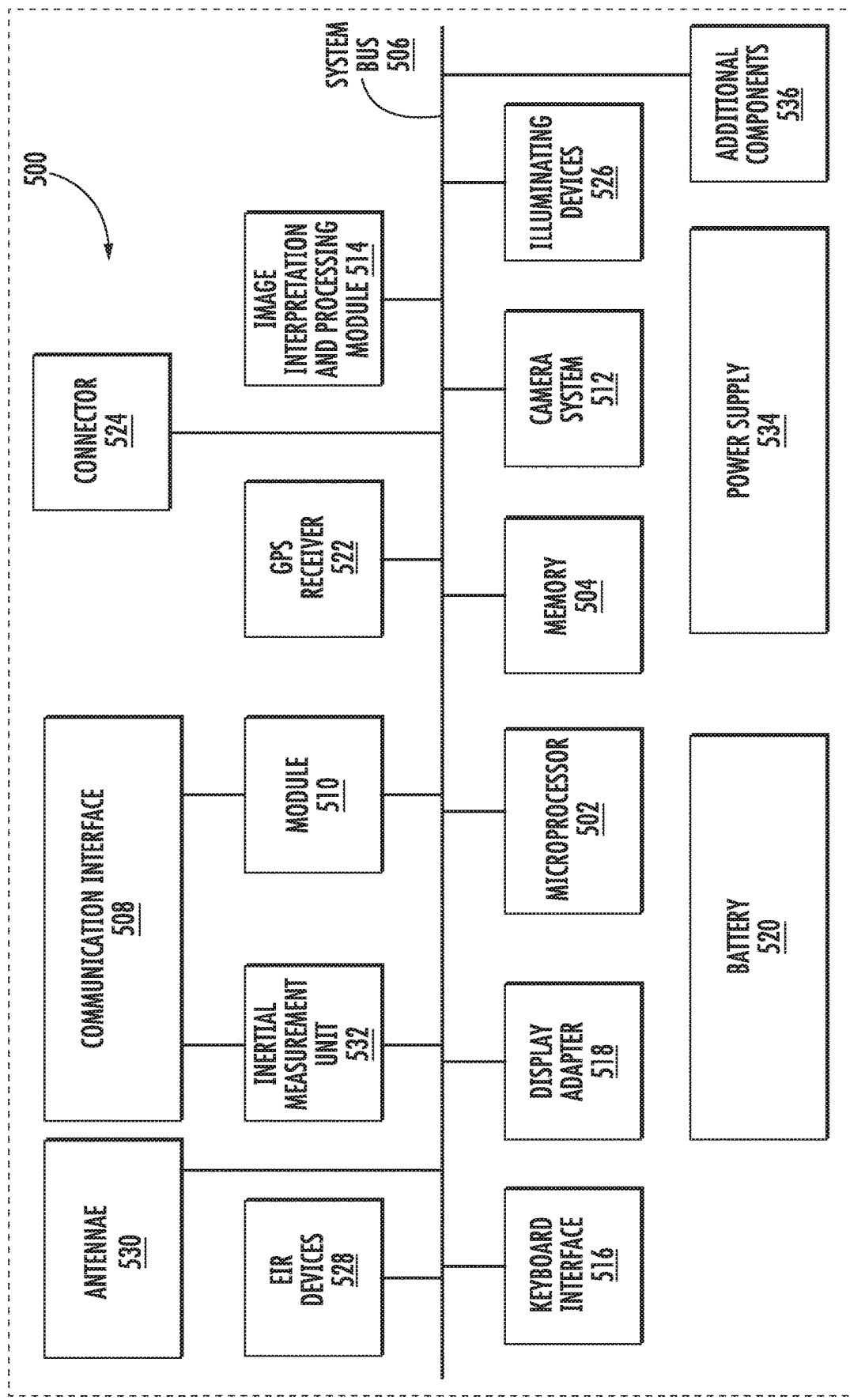
FIG. 5 illustrates a component-level diagram of some embodiments of the RFID apparatus, according to one or more embodiments of the present disclosure described herein.

FIG. 5 illustrates a component-level diagram of some embodiments of the RFID apparatus 500, according to one or more embodiments of the present disclosure. In some embodiments, the RFID apparatus 500 may include at least one microprocessor 502 and a memory 504 (which may be embodied as the memory 118 shown in FIG. 1), both coupled to a system bus 506. The microprocessor 502 may be provided by a general purpose microprocessor or by a specialized microprocessor (e.g., an ASIC). In one embodiment, the RFID apparatus 500 may include a single microprocessor which may be referred to as a central processing unit (CPU). In another embodiment, the RFID apparatus 500 may include two or more microprocessors, for example, a CPU providing some or most of the RFID apparatus functionality and a specialized microprocessor performing some specific functionality (e.g., tag location determination as described herein). The present disclosure should not be contemplated as limiting and other schemes of processing tasks distributed among two or more microprocessors are within the scope of this disclosure.

The RFID apparatus 500 can further include a communication interface 508 communicatively coupled to the system bus 506. In one embodiment, the communication interface 508 (which may be embodied as the communication module 120 shown in FIG. 1), may be implemented by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/IxEV-DO protocol family.

A module 510 is an additional modular component that may be replaced with upgraded or expanded modules and coupled between the system bus 506 and the communication interface 508. The module 510 may be compatible with, for example, auxiliary hard drives (including flash memory), RAM, communication interfaces, etc.

The RFID apparatus 500 may further include a camera system 512 and an image interpretation and processing module 514. In one embodiment, the image interpretation and processing module 514 receives image data from the camera system 512 and processes the information for use in determining the location of one or more RFID tags and presenting an image corresponding to that determined location. In another embodiment, the image interpretation and processing module 514, which is coupled to the system bus 506, exchanges data and control information with the microprocessor 502 or the memory 504.

The RFID apparatus 500 may further include a keyboard interface 516 and a display adapter 518, both also coupled to the system bus 506. The RFID apparatus 500 can further include a battery 520. In one embodiment, the battery 520 may be a replaceable or rechargeable battery pack.

The RFID apparatus 500 may further include a GPS receiver 522 to facilitate providing location information relating to the RFID apparatus 500. The RFID apparatus 500 may also include at least one connector 524 configured to receive, for example, a subscriber identity module (SIM) card. The RFID apparatus 500 can further include one or more illuminating devices 526, provided by, for example, but not limited to, a laser or light emitting diode (LED). The RFID apparatus 500 still further can include one or more encoded indicia reading (EIR) devices 528 provided by, for example, but not limited to, an RFID reading device, a bar code reading device, or a card reading device. In one embodiment, the RFID apparatus 300 can be configured to receive RFID scanning information, such as responses received from activated RFID tags.

The present disclosure should not be contemplated as limiting and devices that read bar codes, read RFID tags, or read cards bearing encoded information may read more than one of these categories while remaining within the scope of this disclosure. For example, a device that reads bar codes may include a card reader, and/or RFID reader; a device that reads RFID tags may also be able to read bar codes and/or cards; and a device that reads cards may be able to also read bar codes and/or RFID. For further clarity, the primary function of a device may involve any of these functions in order to be considered such a device. For example, a cellular telephone, smartphone, or PDA that is capable of reading bar codes or RFID tags is a device that reads bar codes or RFID tags for purposes of this disclosure.

The RFID apparatus 500 may be configured to read the plurality of RFID tags, such as the RFID tags 108 of FIG. 1, and acquire different types of information, for example, backscattered phase information as described herein and communicate such information to the microprocessor 502 or memory 504. In another embodiment, the EIR device 528 may be configured to adjust the RFID transmit power level. Signals transmitted from or received by the RFID apparatus 500 may be provided via antennae 530.

In some embodiments, the RFID apparatus 500 may include an inertial measurement unit (IMU) 532 (containing one or more of a 3-axis accelerometer, a 3-axis magnetometer or a 3-axis gyroscope sensor which may provide orientation information) utilized to record the position of the RFID apparatus 500 in three-dimensional space. The IMU 532 may also assist the RFID apparatus 500 in determining the orientation thereof during the process of scanning for the plurality of RFID tags (such as RFID tags 108 of FIG. 1) as the RFID apparatus 500 moves through space. The orientation of the RFID apparatus 500 includes the position of the RFID apparatus 500 itself relative to a physical structure.

The RFID apparatus 500 may be at a given position, for example (x1, y1, z1), but the orientation of the RFID apparatus 500 at this position may vary. The RFID apparatus 500 may be held upright at a position to define one orientation, and may also be moved to an angle relative to any direction in three-dimensional space (while the position of the RFID apparatus 500 is unchanged). This movement represents a change in orientation. In one embodiment, during the scanning process, both the position and the orientation of the RFID apparatus 500 are calculated by the camera system 512 and/or the IMU 532, and the resultant data is stored and may be used to facilitate locating an item or positioning the RFID apparatus 500 as described in more detail herein. The RFID apparatus 500 may further comprise a power supply 534 provided, e.g., by an AC converter. The components of the RFID apparatus 500 can be incorporated into a variety of different housings including a portable housing (for example, as shown in FIG. 3) and a housing which can be mounted on a fixed structure within a retail, manufacturing or storage facility.

As described herein, various embodiments allow for the determination and display of location information to facilitate locating one or more of the plurality of RFID tags 108 (shown in FIG. 1). For example, a user may enter a desired item to be located and a scanning process is thereafter automatically initiated or initiated by a front panel scan key. During scanning, image information is acquired by the camera system 512 and may be displayed in real-time or after scanning to facilitate locating the item, as described herein.

The RFID apparatus 500 may further include additional components 536 that may be configured to facilitate the RFID apparatus 500 to perform additional operations. For example, an RFID printer encoder may facilitate the RFID apparatus 500 to print labels and encode RFID tags. In another example, a barcode scanner may facilitate the RFID apparatus 500 to scan barcode labels for association with the RFID tag. In another example, a software application, referred to as the "middleware", for example system applications and enterprise applications, may facilitate the RFID apparatus 500 to transfer data from the RFID apparatus 500 to an external system that may process the data. In yet another example, the additional components 536 may include an RF filter, directional coupler, a frequency synthesizer, a baseband modulator, a baseband demodulator, an RF power detector, and the like, each of which may be configured to communicatively couple with each other and facilitate the RFID apparatus 500 to perform certain command-specific operations.

FIGS. 6A-6F illustrate various graphical representations of unwrapped and wrapped first phase and second phase angles of backscattered signals, according to one or more embodiments of the present disclosure described herein. With reference to FIG. 1, the graphical representations correspond to example scenarios in which the first RFID tag 108A is moving from left to right along an X-axis with respect to the RFID reader system 102. The first RFID tag 108A is moving at a constant velocity and at a known initial distance from the RFID reader system 102.

Figure 6B:
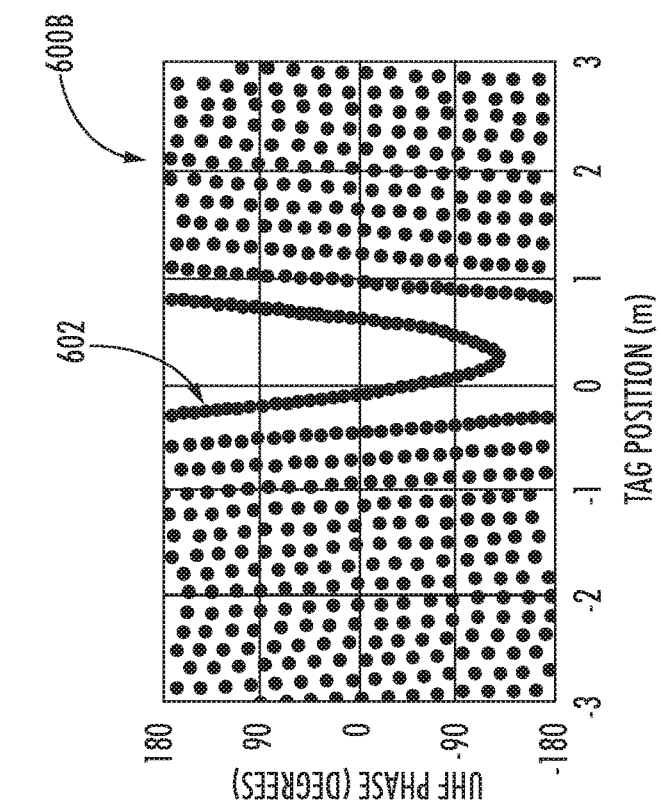
FIGS. 6A and 6B illustrate graphical representations of unwrapped and wrapped first phase angles of first backscattered signal in high frequency bands (for example UHF), according to one or more embodiments of the present disclosure described herein.
Figure 6A:
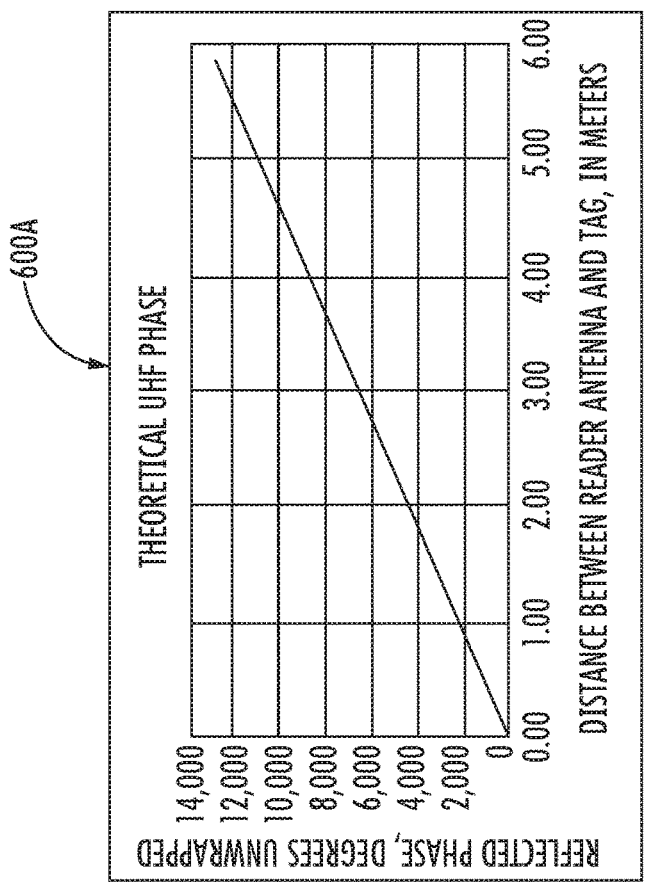

With reference to FIG. 6A, a graphical representation 600A shows the theoretical returned unwrapped first phase angles for high frequency band (for example, UHF) for different tag distances of the first RFID tag 108A from the first antenna 104C. The unwrapped first phase angles extend well beyond the −180/+180 degree limits (for example extending till 14,000 degrees) that are commonly measured with RF devices. With reference to FIG. 6B, a graphical representation 600B shows the theoretical returned wrapped first phase angles for high frequency band (for example, UHF) for different distances as the first RFID tag 108A traverses passed first antenna 104C. The wrapped first phase angles are limited between the −180/+180 degree limits. However, the first phase angles change very rapidly within a tag distance between −3 meters and 3 meters on the X-axis. As shown in the graphical representation 600B, for the graphical plot 602 for example amongst the other graphical plots, the first phase angle has a large negative slope as the tag distance varies from −0.2 meters to nearly 0 meters. As the tag distance approaches 0 meters, the first phase angle wraps up and shows large positive slope very rapidly. Hence, the position of the first RFID tag 108A may not be determined based solely on the first phase angles due to ambiguity as the location of the tag is not uniquely identified.

Figure 6D:
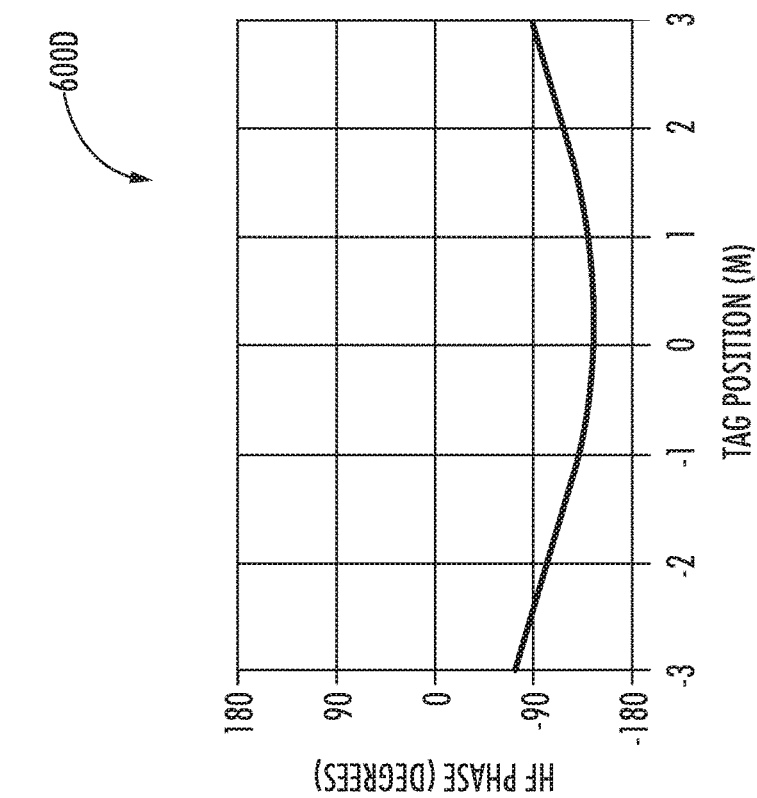
FIGS. 6C and 6D illustrate graphical representations of unwrapped and wrapped second phase angles of second backscattered signal in low frequency bands (for example HF), according to one or more embodiments of the present disclosure described herein.
Figure 6C:
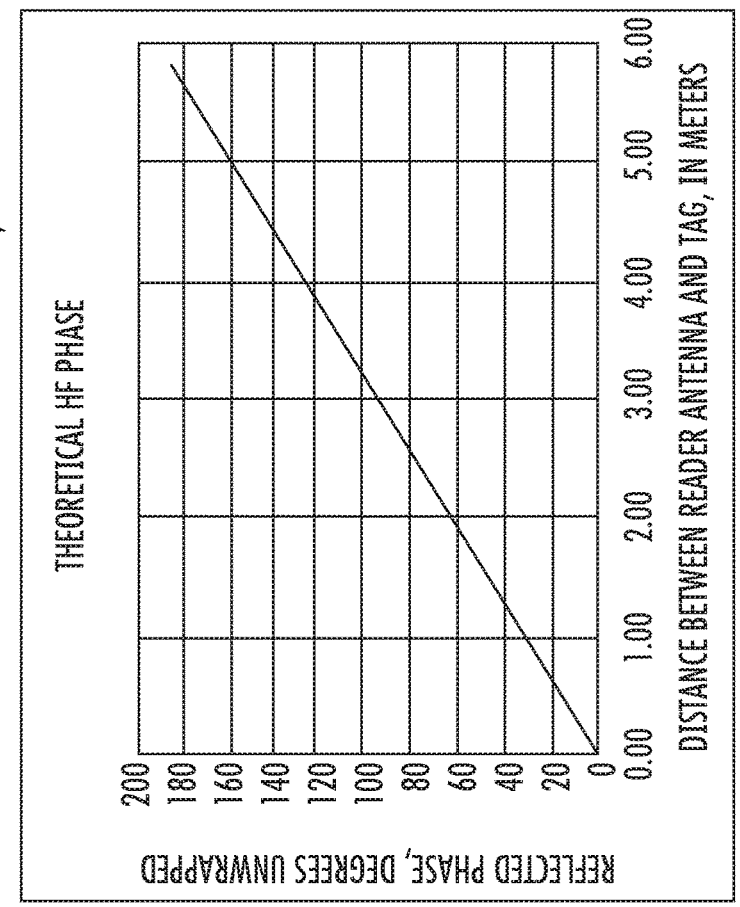

FIGS. 6C and 6D illustrate graphical representations of unwrapped and wrapped second phase angles of second backscattered signal in low frequency bands (for example HF operating at 13 MHz and have a wavelength of approximate 23 meters), according to one or more embodiments of the present disclosure described herein. The graphical representations of 6D may correspond to an example scenario in which the first RFID tag 108A is moving from left to right along an X-axis with respect to the radio transceiver device 106. The first RFID tag 108A is moving at a constant velocity and at a known initial distance from the radio transceiver device 106.

With reference to FIG. 6C, a graphical representation 600C illustrates the theoretical returned unwrapped second phase angles for low frequency band (for example, HF) for different tag distances of the first RFID tag 108A from the second antenna 106C. The unwrapped first phase angles extend well beyond the −180/+180 degree limits, for example extending till 14,000 degrees, that are commonly measured with RF devices. With reference to FIG. 6D, a graphical representation 600D illustrates the theoretical returned wrapped second phase angles for low frequency band (for example, HF) for different tag distances of the first RFID tag 108A from the second antenna 106C. The wrapped second phase angles are limited between the −180/+180 degree limits. The second phase angles change very slowly within a tag distance between −3 meters and 3 meters on the X-axis. As shown in the graphical representation 600D, the second phase angle has a small negative slope as the tag distance varies from −3 meters to nearly 0 meters. As the tag distance approaches 0 meters, the second phase angle wraps up and shows a small positive slope very slowly. Hence, for a given second phase angle, a deterministic position of the first RFID tag 108A may be ascertained, thereby providing an approximated location of the RFID tag 108A. However, such approximated location may not be a precise tag location.

FIGS. 6E and 6F illustrate graphical representations of wrapped first and second phase angles of first and second backscattered signals in high and low frequency bands simultaneously, according to one or more embodiments of the present disclosure described herein. The graphical representations may correspond to an example scenario, in which the first RFID tag 108A is moving from left to right along an X-axis with respect to the RFID reader system 102. The first RFID tag 108A is moving at a constant velocity and at a known initial distance from the RFID reader system 102.

With reference to FIG. 6E, a graphical representation 600E illustrates the theoretical returned wrapped first and second phase angles with noise components for high frequency band (604) and low frequency band (606) for different tag distances of the first RFID tag 108A from the first antenna 104C and the second antenna 106C. The wrapped first and second phase angles are limited within the −180/+180 degree limits.

With reference to FIG. 6F, a graphical representation 600F illustrates the returned wrapped first and second phase angles for high frequency band (608) and low frequency band (610) for tag distances 2.5 to 3.0 meters of the first RFID tag 108A from both of the first antenna 104C and the second antenna 106C. It may be noted that the tag distances indicated between the rapid transition of the UHF phase angles between −180 and +180 with a large negative slope are not valid candidate distances. The graphical representation 600F of the returned first and second phase angles indicate that when the measured second phase is 90 degrees, then the second distance, i.e. the approximate distance of the RFID tag, such as the first RFID tag 108A, is 2.85 meters. Further, when the first phase angle is measured at −120 degrees, then the plurality of first distances, i.e. the candidate distances, of the RFID tag, such as the first RFID tag 108A, are 2.57 meters, 2.73 meters, and 2.89 meters. Out of the plurality of first distances, the main control unit 110 may select a first distance (i.e. 2.89 meters) which is closest to the approximated distance (i.e. 2.85 meters). Hence, the position of the first RFID tag 108A becomes determined without ambiguity, and the location of each tag can be uniquely and precisely determined based on an approximation by the returned second phase angle and refined by the returned first phase angle. Although FIG. 6E illustrates three candidate distances in the above example, the present disclosure contemplates that the number of candidate distances may be more than three or less than three, without deviation from the scope of the disclosure.

Figure 7:
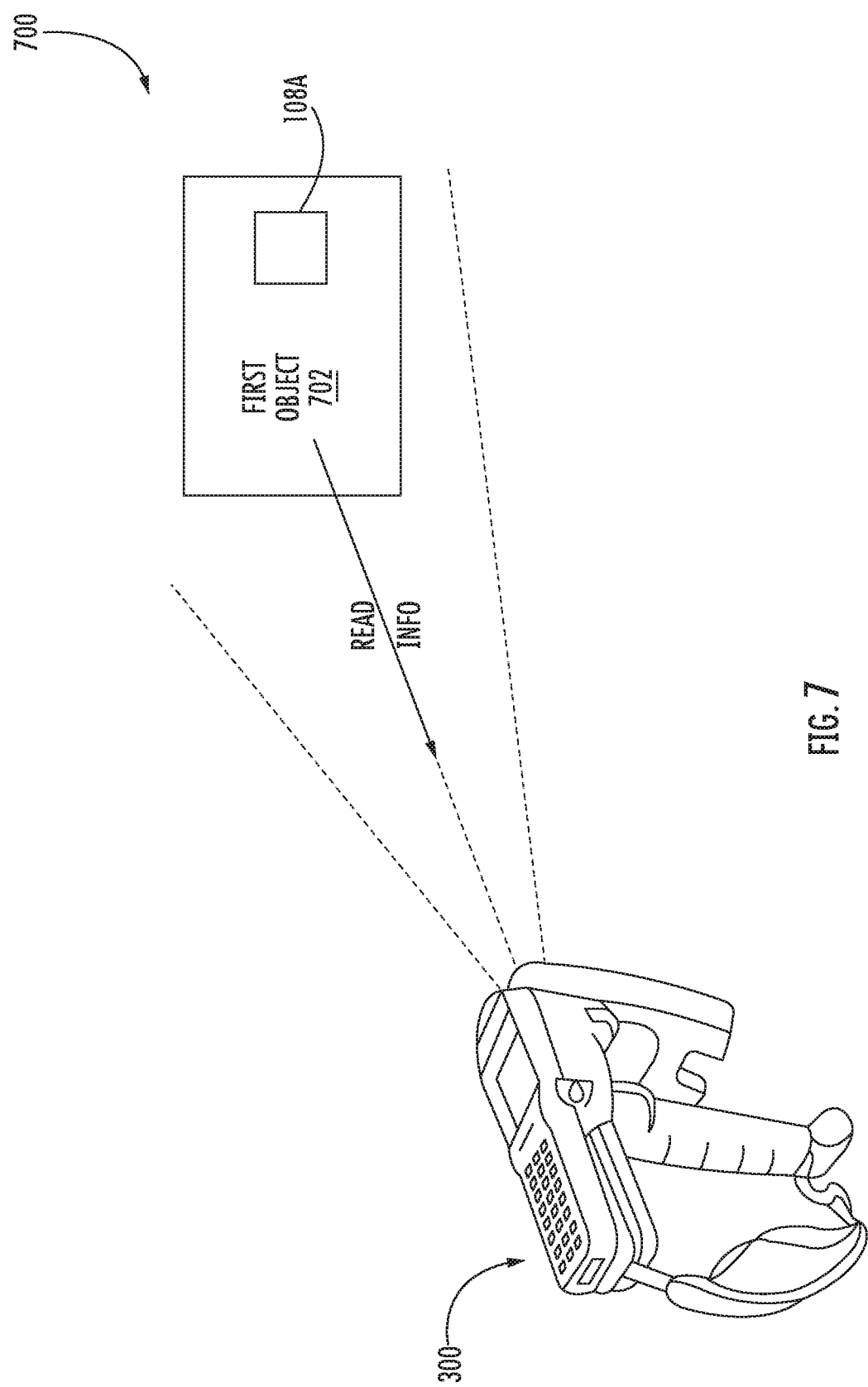
FIG. 7 illustrates an example scenario that depicts the operation of the RFID system in a warehouse facility, according to one or more embodiments of the present disclosure described herein.

FIG. 7 illustrates an example scenario that depicts the operation of the RFID apparatus 300 in a warehouse facility 700, according to one or more embodiments of the present disclosure. In some embodiments, the RFID apparatus 300 is moved in one or more directions to scan a region of interest to locate one or more RFID tags disposed on one or more objects (such as the first RFID tag 108A disposed on a first object 702) using backscattered phase information from the example RFID tag (such as the first RFID tag 108A). In this example, the region of interest includes a warehouse storage area in the warehouse facility 700, including shelving on which many objects are located. Accordingly, the RFID apparatus 300 is moved in order to locate one or more objects of interest having one or more RFID tags.

In the illustrated embodiment, the RFID apparatus 300 is a handheld RFID reader system that can measure backscattered signal phases in different frequency bands, such as HF and UHF, which are used to provide RFID tag location information. For example, as the RFID apparatus 300 is moved across the region of interest (e.g., waved horizontally by a user to search for an item, such as a container), backscattered phase signals are received. The received backscattered phase signals are processed to determine the unique location information of each of the one or more RFID tags (such as the first RFID tag 108A). The unique location information may be presented to the user through the imaging window 318 or the touch screen 306 of the RFID apparatus 300.

FIGS. 8A-8D illustrate flowcharts describing operations of a RFID system for determining location information of the plurality of RFID tags (such as the RFID system 100 for determining location information of the plurality of RFID tags 108) according to one or more embodiments of the present disclosure. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing some embodiments of the present disclosure and executed by a processor in the apparatus. As will be appreciated, any such computer program instructions may be loaded onto a computer or other programmable apparatus (such as, hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a manner such that the instructions stored in the computer-readable storage memory produce an article of manufacture, the execution of which implements the function specified in the flowcharts' block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 8A and 8B when executed, convert a computer or processing circuitry into a machine configured to perform an example embodiment of the present disclosure. Accordingly, the operations of FIGS. 8A and 8B define algorithms for configuring a computer or processor, to perform an example embodiment. In some cases, a general-purpose computer may be provided with an instance of the processor which performs the algorithms of FIGS. 8A-8D transform the general-purpose computer into a machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, may be implemented by special purpose hardware-based computer systems which perform the specified functions, or combinations of special purpose hardware and computer instructions.

Figure 8A:
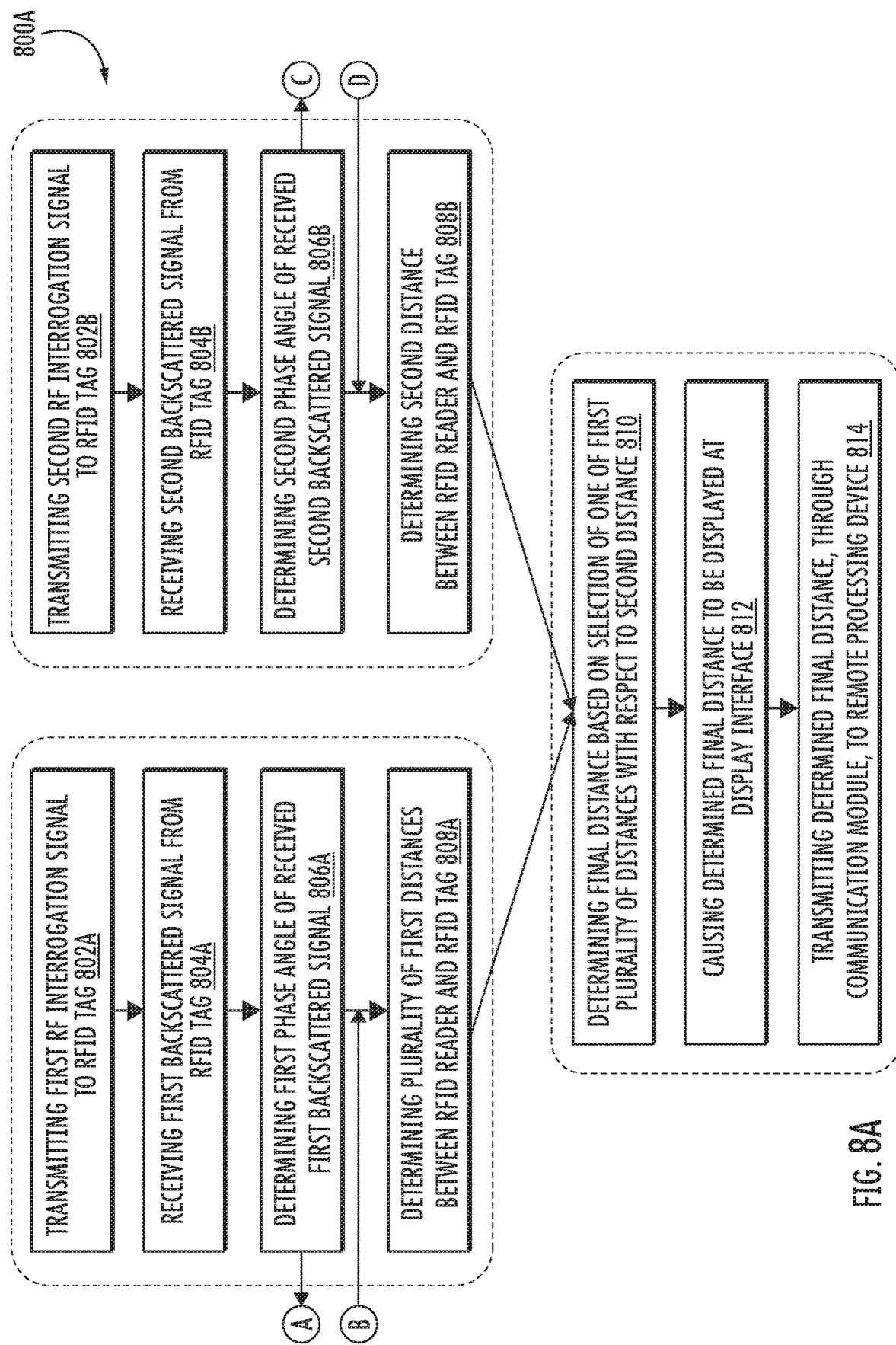
Figure 8B:
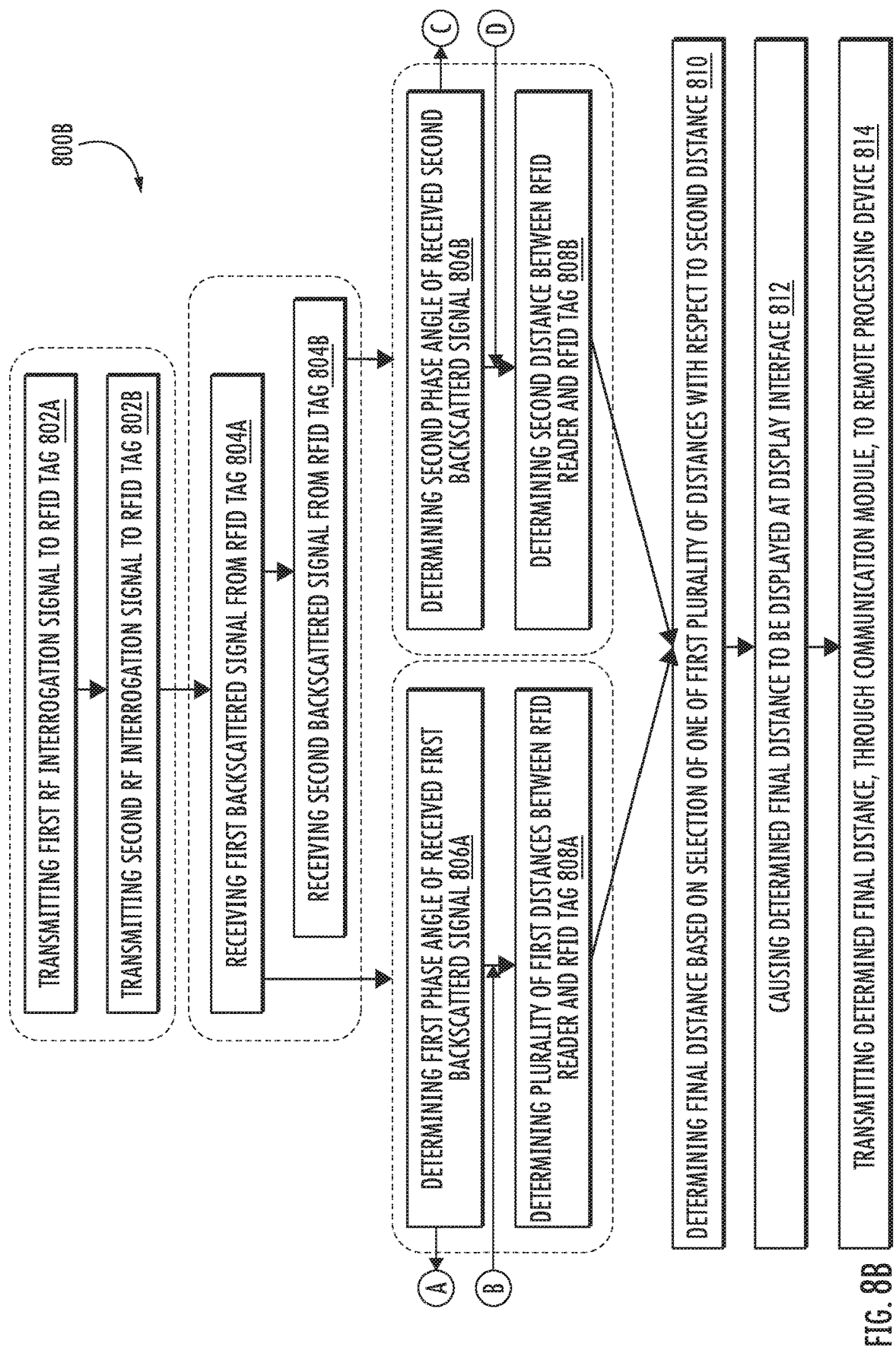

FIGS. 8A and 8B illustrate flowcharts 800A and 800B depicting a method for determining a unique location information of each of the plurality of RFID tags 108, according to one or more embodiments of the present disclosure. In this regard, in an example embodiment, various operations illustrated in reference to FIGS. 8A and 8B may be performed by, with the assistance of, and/or under the control of the circuitry of the RFID system 100.

Figure 8C:
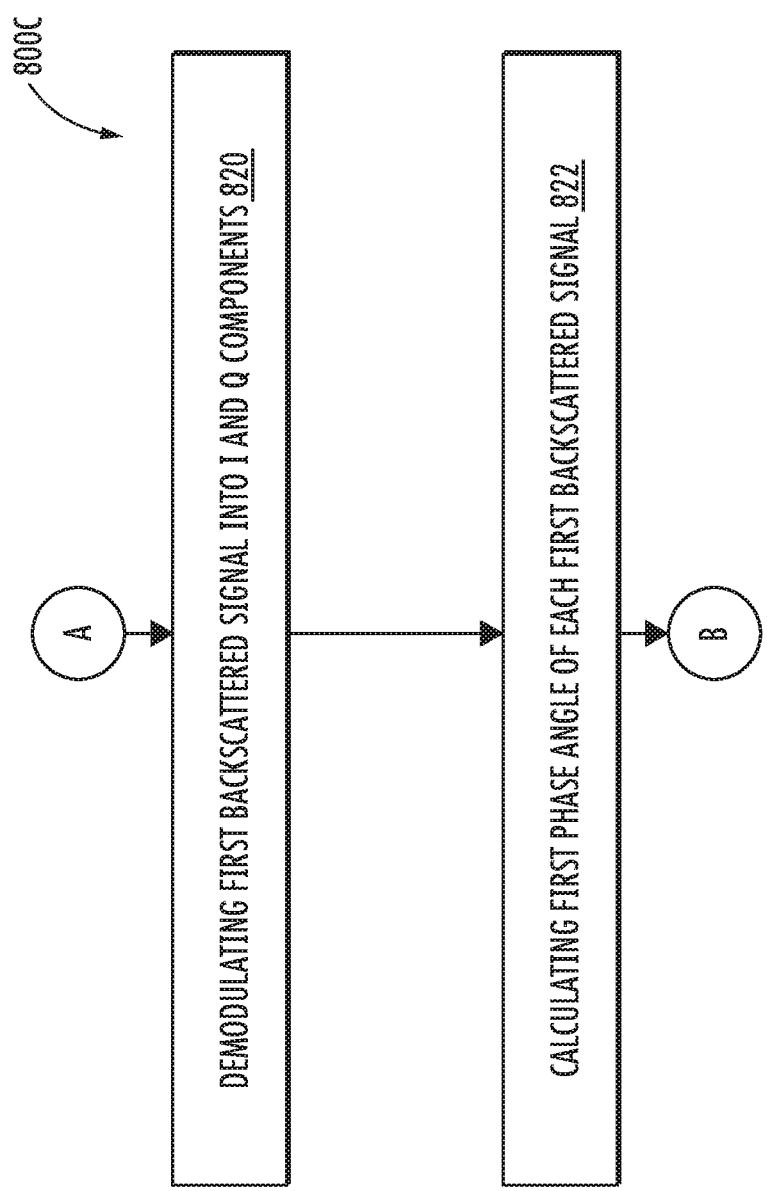

FIG. 8C illustrates a flowchart 800C depicting a method for determining the first phase angle of a first backscattered signal generated by the first RFID tag 108A, according to one or more embodiments of the present disclosure. In this regard, in an example embodiment, various operations illustrated in reference to FIG. 8C may, for example, be performed by, with the assistance of, and/or under the control of the circuitry of the RFID reader 104 in the RFID reader system 102. FIG. 8D illustrates a flowchart 800D depicting a method for determining the second phase angle of a second backscattered signal generated by the first RFID tag 108A, according to one or more embodiments of the present disclosure. In this regard, in an example embodiment, various operations illustrated in reference to FIG. 8D may, for example, be performed by, with the assistance of, and/or under the control of the circuitry of the radio transceiver device 106 in the RFID reader system 102.

The foregoing method descriptions and operations described in the flowcharts 800A-800D illustrated in FIGS. 8A-8D are provided merely as illustrative examples and are not intended to require or imply that the steps of the various embodiments must be performed in the order presented. As will be appreciated by one of skill in the art, the order of steps in the these embodiments may be performed in different orders. In accordance with an example embodiment, FIG. 8A indicates the flowchart 800A in which the operations 802A, 804A, 806A, and 808A are performed in parallel with operations 802B, 804B, 806B, and 808B. The parallel operations being performed in the flowchart 800A correspond to some embodiments in which the RFID reader system 102 transmits the first and the second RF interrogation signals simultaneously, and receives the first and the second backscattered signals simultaneously. In accordance with an alternative example embodiment, FIG. 8B illustrates the flowchart 800B, in which the operations 802A, 804A, 806A, and 808A are performed in a time-alternating manner with operations 802B, 804B, 806B, and 808B. The time-alternating operations being performed in the flowchart 800B corresponds to some embodiments in which the RFID reader system 102 transmits the first and the second RF interrogation signals in a time-alternating manner and also receives the first and the second backscattered signals in a time-alternating manner.

Although FIGS. 8A-8D describe determination of unique location of one RFID tag (e.g. the first RFID tag 108A), the present disclosure contemplates that the determination of unique location of other RFID tags of the plurality of RFID tags 108 may be performed in the similar manner such that the RFID reader system 102 communicates with each of the plurality of RFID tags 108 separately in isolation, one after the other, to prevent any interference of RF signals, without deviation from the scope of the disclosure.

Turning to operation 802A, the RFID system 100 includes means, such as the RFID reader 104, for transmitting a first RF interrogation signal to an RFID tag of the plurality of RFID tags 108, such as the first RFID tag 108A. In an example embodiment, the first RF transmitter 104A in the RFID reader 104 transmits the first RF interrogation signal to the first RFID tag 108A via the first antenna 104C under the control of the main control unit 110. Alternatively, the first RF transmitter 104A in the RFID reader 104 transmits the first RF interrogation signal to the first RFID tag 108A via the first antenna 104C under the control of the first signal processor 104D of the RFID reader 104. In some embodiments, the RFID reader 104 may be operable at a high frequency band, for example, the UHF band.

In some embodiments, the first RF transmitter 104A in the RFID reader 104 transmits the first RF interrogation signal to the first RFID tag 108A via the first antenna 104C upon triggering of the RFID reader system 102 by the user, via an input means (such as the touch screen 306, the keyboard 312 including the scan key 314, or the like in FIG. 3). The triggering of the RFID reader system 102 may activate the first signal processor 104D, under the control of the main control unit 110, to modulate an RF signal frequency band (corresponding to the RFID reader 104 operating at 915 MHz (UHF)) and generate the first RF interrogation signal for interrogation of the first RFID tag 108A.

Turning to operation 804A, the RFID system 100 may include means, such as the RFID reader 104, for receiving the first backscattered signal from the first RFID tag 108A. In an example embodiment, the first RF receiver 104B in the RFID reader 104 receives the first backscattered signal from the first RFID tag 108A via the first antenna 104C.

In some embodiments, the first backscattered signal received from the first RFID tag 108A may include useful data, for example an EPC identifier, a TID, or a representation of a binary string, at least part of which is equal to at least part of the specified one or more TIDs. The first RFID tag 108A transmits the first backscattered signal to the RFID reader 104 when the first RFID tag 108A inverts its inventoried flag and transitions to the "Ready state." The inventoried flag may specify one of four available sessions defined in a standard protocol, such as Gen-2. When the RFID reader 104 reads the EPC number of each RFID tag, the inventoried flag of the RFID tag may switch, and the RFID tag may no longer participate in the inventory round. Thus, the RFID reader 104 may verify that all the RFID tags within range have been read when there are no more RFID tags left with a given inventoried flag. This may require the RFID reader 104 to use a proper session. For example, Sessions S2, and S3 may have a persistence time and the RFID reader 104 may energize the RFID tags before the persistence time expires. S0 may have a zero-persistence time (i.e. the RFID reader 104 must continually energize the RFID tags). Further, for S1, it must be ensured that the entire inventory round does not last longer than the persistence time. The first RFID tag 108A attains the "Ready state" after a sequence of transitions, as described in detail in FIG. 1.

Turning to operation 806A, the RFID reader 104 may include means, such as the first signal processor 104D, for determining a first phase angle of the received first backscattered signal. In some embodiments, the first signal processor 104D in the RFID reader 104 determines the first phase angle of the received first backscattered signal.

In some embodiments, the first phase angle of the first backscattered signal received in response to the first RF interrogation signal may be utilized to provide the basic information that can be used to determine spatial information about an RFID tag associated with an object, such as the first RFID tag 108A, as described in operation 810. Examples of the object may include, but are not limited to, a package, an item, a person, or an animal.

In some embodiments, the first signal processor 104D, in conjunction with the main signal processor 112, may be configured to determine the first phase angle (such as, φ) of the first backscattered signal based on the operations 820-822, described in FIG. 8C.

With reference to FIG. 8C, at operation 820, the RFID reader 104 may include means, such as the first RF receiver 104B, for demodulating the first backscattered signal into an I (in-phase) component and Q (quadrature) component. In various embodiments, the values for I and Q may be noisy. Thus, the RFID reader 104 may use multiple adjacent I and Q values in the first backscattered signal, for example, by taking the root mean square (RMS) value of several adjacent I samples as the I value, and the RMS value of several adjacent Q samples as the Q value.

More specifically, the I and Q components of the received and demodulated first backscattered signal are composed of direct current (DC) and alternating current (AC) parts, represented by following equations (1) and (2):

$$I = I_{ac} + I_{dc} \quad (1)$$

$$Q = Q_{ac} + Q_{dc} \quad (2)$$

The DC parts may be due to the RFID reader 104 transmit-receive leakage, static environment clutter, and backscatter from the first RFID tag 108A (which contains both static and modulated components).

In some embodiments, the RFID reader 104 may include means, such as the main signal processor 112 or the first signal processor 104D in conjunction with the main signal processor 112, for determining the signal strength averages for the I and Q signals of the first backscattered signal.

In some embodiments, after the DC part is filtered out, the main signal processor 112 or the first signal processor 104D in conjunction with the main signal processor 112, centers the RFID tag constellation (i.e. adjacent RFID tags) at zero and measures the RSSI as represented by following equation (3):

$$RSSI = \frac{1}{2} * \frac{|\vec{v}_{tag}^2 - \vec{v}_{tag}^1|}{Z_0} \quad (3)$$

where $Z_0$ is the input impedance (such as 50Ω) of the first RF receiver 104B, $\vec{v}_{tag}^i$ is the voltage due to the first backscattered signal from the first RFID tag 108A when the signal processors 206 indicate that the integrated circuit (IC) of the first RFID tag 108A is in state i.

Turning to operation 822, the RFID reader 104 may include means, such as the main signal processor 112 or the first signal processor 104D in conjunction with the main signal processor 112, for calculating the first phase angle (φ) of the first backscattered signal by taking the arctangent of (Q/I), as represented by following equations (4) and (5).

$$\varphi = ang\left(\vec{v}_{tag}^{2} - \vec{v}_{tag}^{1}\right) \quad (4)$$

$$= \arctan Q_{ac}/I_{ac} \quad (5)$$

where, in some embodiments, the arctangent of (Q/I) may be aided by a lookup table, and $\vec{v}_{tag}^{i}$ is the voltage due to the first backscattered signal from the first RFID tag 108A when the signal processors 206 indicate that the integrated circuit (IC) of the first RFID tag 108A is in state i/.

In a propagation environment of the RFID system 100, the phase angle of the received first backscattered signal may be calculated by following equation (6):

$$\varphi = \varphi_{prop} + \varphi_0 + \varphi_{BS} \quad (6)$$

where $\varphi_{prop}$ is the phase accumulated due to the electromagnetic wave propagation, $\varphi_0$ is the phase offset which includes phases of the cables and other RFID reader 104 and antenna components, and $\varphi_{BS}$ is the backscatter phase of the tag modulation.

In some embodiments, if an initial tag distance is known, the first signal processor 104D in the RFID reader 104 may use a classical phasor formula for electromagnetic field propagating in free space (whose phase is proportional to the distance travelled). In such some embodiments, the phase accumulated due to the electromagnetic wave propagation may be calculated, as represented by following equation (7):

$$\varphi_{prop} = -2\ Kd \quad (7)$$

where K=2πf/c is the wavevector (proportional to the frequency), and d is the initial distance of the tag.

The phase angle, as calculated based on equation (7), linearly varies with the initial tag distance. When the tag is moved away or towards the RFID reader 104 (in free space), both vectors $\vec{v}_{tag}^{1}$ and $\vec{v}_{tag}^{2}$ rotate simultaneously and cause 360 degrees tag signal phase angle change for every λ/2 of radial tag movement, as illustrated in graphical representations 600A and 600B described in FIGS. 6A and 6B, respectively. Subsequent to operation 822, the flowchart 800C returns to operation 808A of FIG. 8A or FIG. 8B.

Turning to operation 808A, the RFID reader 104 may include means, such as the first signal processor 104D, for determining a plurality of first distances between the RFID reader 104 and the first RFID tag 108A based on the first phase angle determined by the RFID reader 104, as shown in the operations described in FIG. 8C.

In some embodiments, the RFID reader 104 may include means, such as the first signal processor 104D, for determining each of the first plurality of distances by measuring the first phase angles at different frequencies. In various embodiments, the determination maybe based on ranging technique, such as frequency modulated continuous wave (FM CW) radar, or similar harmonic radar. By measuring the first phase angles of the first backscattered signal at several frequencies, taking the derivative of the first phase angle with respect to frequency of the first RF signal, and assuming that (a) other two components of the tag phase (phase offset and tag backscatter phase) do not change with frequency or can be calibrated out, and (b) the tag has not moved much (less than wavelength) during the measurements, the first signal processor 104D determines one of the first plurality of distances, as represented by following equation (8):

$$d = -\frac{c}{4\pi} * \frac{\partial \varphi}{\partial f} \quad (8)$$

where c is the speed of light, f is the transmitting carrier frequency, and $$\frac{\partial \varphi}{\partial f}$$

corresponds to partial derivative of the first phase angle with respect to frequency of the first RF signal.

However, the first RFID tag 108A may be a hybrid UHF/HF tag that is moving in free space on a specific trajectory on a horizontal axis at a distance (for example, 1 meter) with respect to the RFID reader 104. In such a case, the first phase angle of the first backscattered signal corresponding to the higher frequency RF signal (for example, UHF) may roll over +180 degrees to −180 degrees multiple times over the course of the movement of the first RFID tag 108A from left to right. The phase angles of the first backscattered signal may roll over +180 degrees to −180 degrees multiple times because, at higher frequency bands (such as UHF (for example, 915 MHz)), the wavelength is small (for example, about 30 cm), as shown in FIG. 6B.

For example, referring back to FIG. 6A, in the example scenario, considering the first phase angles to be "unwrapped" (i.e. the first phase angles are extending beyond the −180/+180 degree limits), the first phase angles change very rapidly extending beyond 12,000 degrees for the same distance range. Thus, the first phase angle of the received first backscattered signal rolls over between −180/+180 degree each time the first RFID tag 108A is moved half a wavelength towards or away from the RFID reader 104. Consequently, the first signal processor 104D may determine a plurality of first distances between the RFID reader 104 and the first RFID tag 108A. For example, referring back to FIG. 6F, for an example distance range between 2.5 to 3.0 meters, if the determined first phase angle is −120 degrees, then the plurality of first distances are at least 2.57 meters, 2.73 meters, and 2.89 meters. Subsequent to operation 808A, the flowchart proceeds to operation 810.

Turning to operation 802B, the RFID system 100 includes means, such as the radio transceiver device 106, for transmitting a second RF interrogation signal to the RFID tag of the plurality of RFID tags 108, such as the first RFID tag 108A. In an example embodiment, the second RF transmitter 106A in the radio transceiver device 106 transmits the second RF interrogation signal to the first RFID tag 108A via the second antenna 106C under the control of the main control unit 110. Alternatively, the second RF transmitter 106A in the radio transceiver device 106 transmits the second RF interrogation signal to the first RFID tag 108A via the second antenna 106C under the control of the second signal processor 106D that is local to the radio transceiver device 106. In some embodiments, the radio transceiver device 106 may be operable at a low frequency band. For example, the low frequency band may correspond to the HF band. As discussed above, the second wavelength of the second RF interrogation signal transmitted by the radio transceiver device 106 is longer than a first wavelength of the first RF interrogation signal transmitted by the RFID reader 104.

In some embodiments, the second RF transmitter 106A in the radio transceiver device 106 transmits the second RF interrogation signal to the first RFID tag 108A via the second antenna 108C upon triggering of the RFID reader system 102 by the user, via an input means (such as the touch screen 306, the keyboard 312 including the scan key 314, or the like in FIG. 3). The triggering of the RFID reader system 102 may activate the second signal processor 106D, under the control of the main control unit 110, to modulate an RF signal in lower frequency band (corresponding to the radio transceiver device 106 operating at 13.6 MHz (HF)) and generate the second RF interrogation signal for interrogation of the first RFID tag 108A.

Turning to operation 804B, the RFID system 100 may include means, such as the radio transceiver device 106, for receiving the second backscattered signal from the first RFID tag 108A. In an example embodiment, the second RF receiver 106B in the radio transceiver device 106 receives the second backscattered signal from the first RFID tag 108A via the second antenna 106C.

Turning to operation 806B, the radio transceiver device 106 may include means, such as the second signal processor 106D, for determining a second phase angle of the received second backscattered signal. In some embodiments, the second signal processor 106D (local to the radio transceiver device 106) determines the second phase angle of the received second backscattered signal, as described in flowchart 800D in FIG. 8D. The second phase angle of the second backscattered signal is unique at a distance up to half of wavelength of the second RF interrogation signal. The distance may correspond to a maximum range of the first RF interrogation signal, i.e. the UHF interrogation signal.

With reference to flowchart 800D in FIG. 8D, turning to operation 830, the radio transceiver device 106 includes means, such as the second antenna 106C, for generating two representative signals corresponding to the received second backscattered signal. In some embodiments, a first sub-antenna (such as whip, dipole, or monopole antenna) of the second antenna 106C may be configured to generate the first representative signal, which corresponds to a first component of the second backscattered signal. Further, a second sub-antenna (such as loop and loopstick antenna) of the second antenna 106C may be configured to generate the second representative signal, which corresponds to a second component of the second backscattered signal. In some embodiments, the first sub-antenna is an electric or E-field antenna that permits the second RF receiver 106B to generate the first representative signal provided to signal comparator. In some embodiments, the second sub-antenna is a magnetic or H-field antenna that permits the second RF receiver 106B to generate the second representative signal provided to signal comparator. The first and the second components of the second backscattered signal may differ in polarization or other such detectable property.

Turning to operation 832, the radio transceiver device 106 includes means, such as the second signal processor 106D, for identifying a difference between the two representative signals that correspond to the second backscattered signal. In some embodiments, a signal comparator in the second signal processor 106D may be configured to identify a difference between the two representative signals that correspond to the second backscattered signal. In various embodiments, the identified difference may be a difference in phase, a difference in amplitude, or any other difference between the two representative signals. In some embodiments, the signal comparator (which may be embodied as a phase detector) in the second signal processor 106D of the radio transceiver device 106 identifies the difference between the two representative signals and generates a third signal proportional to or otherwise related to the difference identified by signal comparator.

In some embodiments, the signal comparator (embodied in a phase detector) may be configured to determine a phase difference between the two representative signals. The phase detector may correspond to a mixer that receives the two representative signals and produces a quasi-static signal proportional to a quasi-static phase difference between the first and second representative signals. In an alternate embodiment, the phase detector may be implemented with an AND gate having the two representative signals as inputs, and the output of the AND gate is provided to an integrator. The output of the integrator is a quasi-static signal proportional to a quasi-static phase difference between the two representative signals. The term "Quasi-static" may correspond to varying on a time scale substantially similar to a variation in phase.

In some embodiments, the phase detector may receive or capture a time domain signal and detect zero crossings or other characteristics of wave shape in order to determine an effective phase difference between the two representative signals. Subsequent to operation 832, the flowchart 800D returns to operation 808B of FIG. 8A or FIG. 8B.

Turning to operation 808B, the radio transceiver device 106 may include means, such as the second signal processor 106D, for determining a second distance between the RFID reader 104 and the first RFID tag 108A based on the second phase angle determined by the radio transceiver device 106.

The radio transceiver device 106 includes means, such as the second RF receiver 106B, for determining a second distance between the first RFID tag 108A and the radio transceiver device 106. In some embodiments, the second signal processor 106D of the radio transceiver device 106 receives the third signal from the signal comparator through the second RF receiver 106B, and determines the second distance between the first RFID tag 108A and the radio transceiver device 106.

In some embodiments, the second signal processor 106D may be configured to convert the measured phase difference to the second distance between the radio transceiver device 106 and the first RFID tag 108A. In another embodiment, the second signal processor 106D, in conjunction with an analog to digital converter and a micro-controller or micro-processor, may be configured to calculate the second distance based on an applied voltage received from the phase detector. For example, the signal processor 106D may determine the second distance (this is an approximate distance) between the RFID reader 104 and the first RFID tag 108A (based on the second phase angle determined by the radio transceiver device 106) to be as 2.85 meters.

Turning to operation 810, the RFID reader system 102 includes means, such as the main control unit 110, for determining a final distance between the RFID reader 104 and the first RFID tag 108A based on a selection of one of the plurality of first distances with respect to the determined second distance. The main control unit 110 may be configured to select one of the plurality of first distances that is nearest to the determined second distance. Continuing with the example, the one of the plurality of first distances, i.e. 2.89 meters, is nearest to approximate distance 2.85 meters, so the final distance in the example is 2.89 meters.

Turning to operation 812, the RFID system 100 includes means, such as the main control unit 110, for causing the determined final distance between the RFID reader system 102 and the first RFID tag 108A to be displayed at a user interface on the display interface 114 of the RFID reader system 102.

Turning to operation 814, the RFID system 100 includes means, such as the main control unit 110, for transmitting the determined final distance between the RFID reader system 102 and the first RFID tag 108A, through the communication module 120, to a remote processing device operable in a specific application area.

Figure 9A:
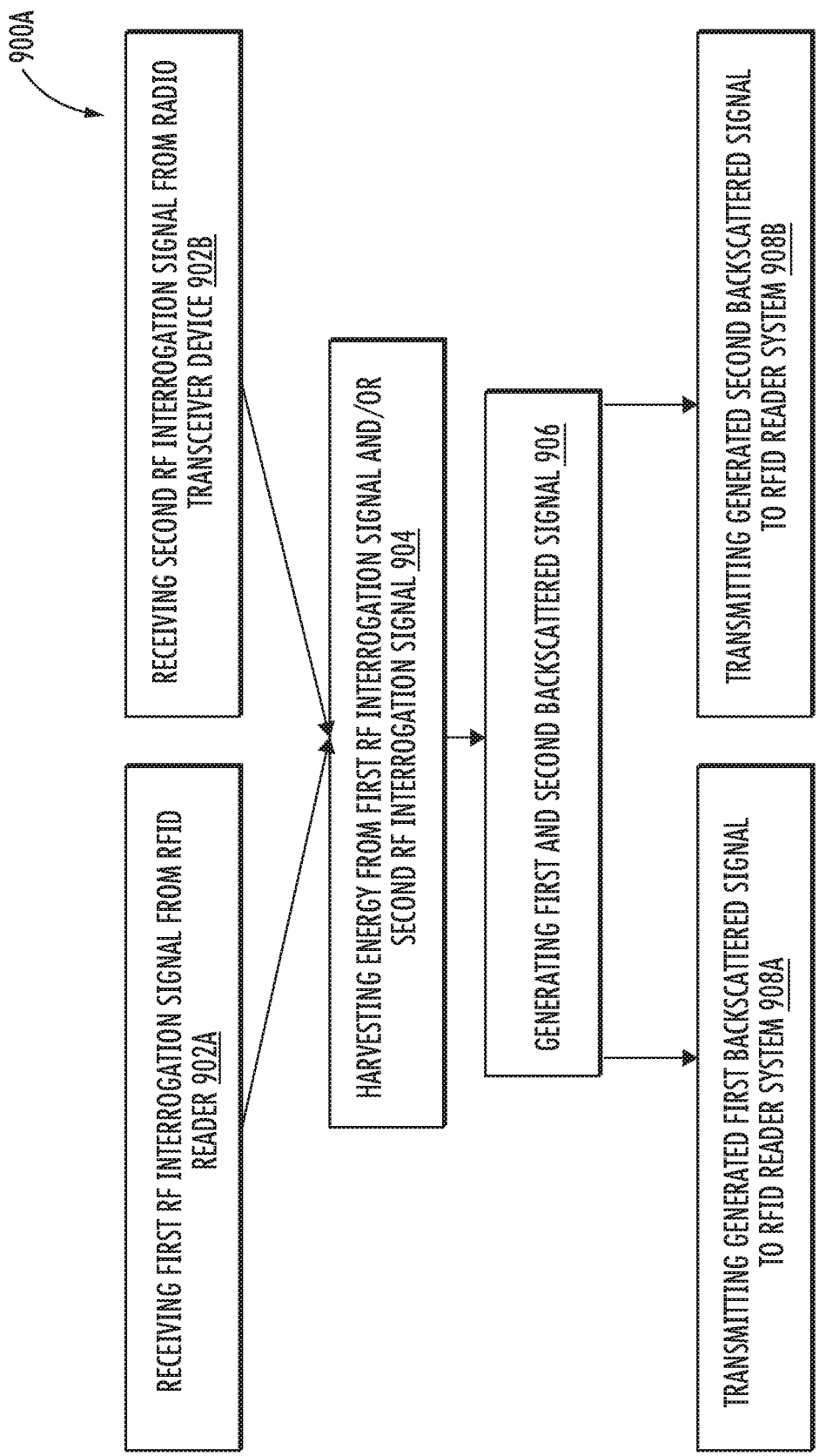
FIGS. 9A and 9B illustrate flowcharts depicting a method for generating backscattered signals by an RFID tag, according to one or more embodiments of the present disclosure described herein.
Figure 9B:
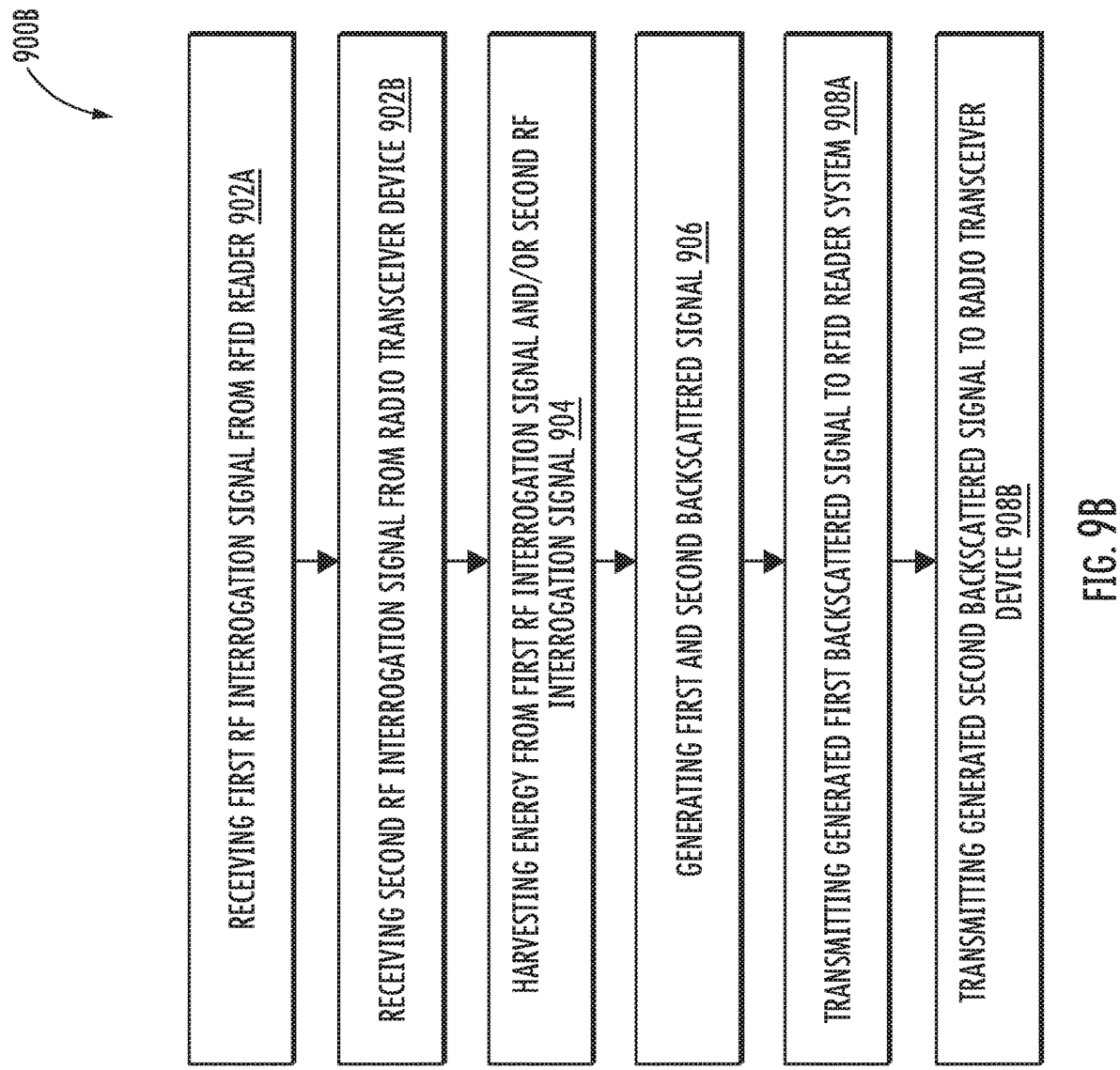

FIGS. 9A and 9B illustrate flowcharts 900A and 900B depicting a method for generating backscattered signals by the first RFID tag 108A, according to one or more embodiments of the present disclosure. In an example embodiment, various operations illustrated in reference to FIGS. 9A and 9B may be performed by, with the assistance of, and/or under the control of the circuitry of the RFID tags 108 (for example, RFID tag 108A) in the RFID system 100.

FIG. 9A indicates the flowchart 900A in which the operations 902A and 908A are performed in parallel with operations 902B and 908B, respectively. In accordance with an alternative example embodiment, FIG. 9B indicates the flowchart 900B in which the operation 902A is performed in a time-alternating manner with operation 902B, and operation 908A is performed in a time-alternating manner with operation 908B. The time-alternating operations being performed in the flowchart 900B corresponds to some embodiments in which the first RFID tag 108A receives the first and the second RF interrogation signals in a time-alternating manner and also transmits the first and the second backscattered signals in a time-alternating manner.

Turning to operation 902A, the first RFID tag 108A includes means, such as the RFID tag antenna 202, for receiving the first RF interrogation signal from the RFID reader 104. In an example embodiment, the RF frontend 204 in the first RFID tag 108A receives the first RF interrogation signal from the RFID reader 104 via the RFID tag antenna 202.

Turning to operation 902B, the first RFID tag 108A includes means, such as the RFID tag antenna 202, for receiving the second RF interrogation signal from the radio transceiver device 106. In an example embodiment, the RF frontend 204 in the first RFID tag 108A receives the second RF interrogation signal from the radio transceiver device 106 via the RFID tag antenna 202.

In some embodiments, the RFID tag antenna 202 of the RFID tag include different sub-antennas, each sub-antenna being configured for a corresponding frequency band. For example, with reference to FIG. 2, the first sub-antenna corresponds to the first antenna structure 210A operable at a first frequency, and the second sub-antenna corresponds to the second antenna structure 210B operable at a second frequency. In another embodiment, the RFID tag antenna 202 of the RFID tag is a dual-band antenna in which the tag antenna of the first RFID tag 108A is tuned to be operable at different frequency bands.

Turning to operation 904, the first RFID tag 108A includes means, such as the RF frontend 204, for harvesting energy from one of the first RF interrogation signal and/or the second RF interrogation signal. In an example embodiment, the RFID tag antenna 202 of the first RFID tag 108A may be configured to cause a power to be induced, thereby harvesting energy upon receiving the first backscattered signal from the RFID reader 104 and the second backscattered signal from the radio transceiver device 106. In some embodiments, the harvested energy may be utilized to power the first antenna structure 210A and the second antenna structure 210B, through the feed terminal 208.

In some embodiments, each of the plurality of RFID tags 108 may implement a state machine. Once energized, each of the plurality of RFID tags 108, such as the first RFID tag 108A, may change its current state to "Ready state." The first RFID tag 108A may select a random integer from the range of, for example $[0; 2^{Q-1}]$, responsive to receiving "Query command" from the RFID reader system 102. If the value of zero is selected, the first RFID tag 108A may transition to the "Reply state" for backscattering a 16-bit random number in form of RF signals, as described in operation 906. If a non-zero value is selected, the RFID tag may load the selected random integer into its slot counter and change its state to "Arbitrate state." Each RFID tag may implement a 15-bit slot counter. An RFID tag with non-zero slot counter remains in the "Arbitrate state" until its slot counter equals zero. Tags in the "Arbitrate state responds to all commands, such as Query, QueryRep and QueryAdjust commands.

Turning to operation 906, the first RFID tag 108A includes means, such as the signal processors 206, for generating the first backscattered signal. In an example embodiment, the first antenna structure 210A, operable in the first frequency band and in conjunction with the signal processors 206, may be configured to generate the first backscattered signal based on the received first RF interrogation signal.

Further, the first RFID tag 108A includes means, such as the signal processors 206, for generating the second backscattered signal. In an example embodiment, the second antenna structure 210B, operable in the second frequency band and in conjunction with the signal processors 206, may be configured to generate the second backscattered signal based on the received second RF interrogation signal. The first antenna structure 210A may be configured to backscatter high frequency band signals and the second antenna structure 210B may be configured to backscatter low frequency band signals.

In some embodiments, in response to receiving the RFID tag transmission from the first RFID tag 108A, the RFID reader system 102 may acknowledge with "Ack command" containing the same random number. In response to receiving the "Ack command", the first RFID tag 108A may change its state to "Acknowledged state" and backscatter its protocol control (PC) bits, EPC and cyclic redundancy check (CRC) value to each of the RFID reader 104 and the radio transceiver device 106, according to respective frequency bands. If the first RFID tag 108A is unacknowledged, the signal processors 206 in the first RFID tag 108A may select a new random integer from the range of $[0; 2^{Q-1}]$, load the value into its slot counter, and change its state to "Arbitrate state." In response to receiving "QueryAdjust command", the first RFID tag 108A in the "Arbitrate state" decrements the value of its slot counter and backscatter its PC bits, EPC and CRC value if its slot counter is equal to zero. The "QueryAdjust command" may be one of the basic inventory commands that may be used to adjust a value of the slot counter of an RFID tag, such as the first RFID tag 108A, without changing any other parameters.

Turning to operation 908A, the first RFID tag 108A includes means, such as the RFID tag antenna 202, for transmitting the generated first backscattered signal to the RFID reader 104. In an example embodiment, the first antenna structure 210A of the first RFID tag 108A may be configured to transmit the generated first backscattered signal to the RFID reader 104 in the RFID reader system 102.

In response to transmitting the PC, EPC and 16-bit CRC value of the RFID tag to the RFID reader system 102, the first RFID tag 108A may receive a "QueryAdjust command" from the RFID reader system 102 causing the first RFID tag 108A to invert its Inventoried flag and to transition to "Ready state." Thereafter, the first RFID tag 108A may be configured to receive various access commands from the RFID reader system 102 for communication. The access commands may include various commands, for example, requesting a handle from an RFID tag, read from and/or write to reserved, EPC, TID and memory of the RFID tag, disable the RFID tag, lock the RFID tag, and the like.

Turning to operation 908B, the first RFID tag 108A includes means, such as the RFID tag antenna 202, for transmitting the generated second backscattered signal to the radio transceiver device 106. In an example embodiment, the second antenna structure 210B of the first RFID tag 108A, may be configured to transmit the generated second backscattered signal to the radio transceiver device 106 in the RFID reader system 102. In some embodiments, as illustrated in FIG. 9A, the first backscattered signal and the second backscattered signal are transmitted simultaneously. In another embodiment, as illustrated in FIG. 9B, the first backscattered signal and the second backscattered signal are transmitted in time alternating manner.

As described in FIGS. 9A and 9B, the first RFID tag 108A may have a long range (expected from a high frequency (such as UHF) RFID tags), which is of the order of 10 meters. The distance to the first RFID tag 108A is calculated based on its low frequency (such as HF) second phase angle of the second backscattered signal, which is unique at distances up to half wavelength (for example, 11 meters for 13.56 MHz), which is the maximum practical range for the high frequency (such as UHF) RFID tags.

In some example embodiments, certain ones of the operations herein may be modified or further amplified. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Alternatively, some steps or methods may be performed by circuitry that is specific to a given function.

Embodiments of the present disclosure have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, may be implemented by various means including computer program instructions. These computer program instructions may be loaded onto a general purpose computer, special purpose computer, or other programmable data processing apparatus discussed above with reference to FIG. 1, to produce a machine, such that the computer program product includes the instructions which execute on the computer or other programmable data processing apparatus create a means for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, may be implemented by special purpose hardware-based computer systems that perform the specified functions or steps, or combinations of special purpose hardware and computer instructions.

In one or more aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure(s). Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure(s) set out in any claims that may issue from this disclosure. For instance, a description of a technology in the "Background" is not to be construed as an admission that certain technology is prior art to any disclosure(s) in this disclosure. Neither is the "Summary" to be considered as a limiting characterization of the disclosure(s) set forth in issued claims. Furthermore, any reference in this disclosure to "disclosure" in the singular should not be used to argue that there is only a single point of novelty in this disclosure. Multiple disclosures may be set forth according to the limitations of the multiple claims issuing from this disclosure, and such claims accordingly define the disclosure(s), and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other objects shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the disclosures are not to be limited to the specific embodiments disclosed and that modifications and other embodiments are intended to be included within the scope of the appended claims. For example, the various elements or components may be combined or integrated in another system or certain features may be omitted or not implemented. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A radio frequency identification (RFID) reader system comprising:
    an RFID reader operable at a first frequency band and configured to:
        receive a first backscattered signal from an RFID tag in response to a transmission of a first radio frequency (RF) interrogation signal; and
        determine a first phase angle of the received first backscattered signal;
    a radio transceiver device operable at a second frequency band different from the first frequency band, wherein the radio transceiver device is configured to:
        receive a second backscattered signal from the RFID tag in response to a transmission of a second RF interrogation signal; and
        determine a second phase angle of the received second backscattered signal; and
    a main control unit coupled to the RFID reader and the radio transceiver device, wherein the main control unit is configured to:
        determine a plurality of first distances based on the first phase angle determined by the RFID reader;
        determine a second distance based on the second phase angle determined by the radio transceiver device; and
        select one of the plurality of first distances as a final distance between the RFID reader and the RFID tag based on the determined second distance.

2. The RFID reader system according to claim 1, wherein the RFID reader is operable at the first frequency band comprising a high frequency band and the radio transceiver device is operable at the second frequency band comprising a low frequency band.

3. The RFID reader system according to claim 1, wherein the transmission of the second RF interrogation signal is simultaneous to the transmission of the first RF interrogation signal.

4. The RFID reader system according to claim 1, wherein the transmission of the second RF interrogation signal is in time alternating manner with respect to the first RF interrogation signal.

5. The RFID reader system according to claim 1, wherein the first RF interrogation signal and/or the second RF interrogation signal are configured to energize the RFID tag, wherein the energized RFID tag is utilized to power a first antenna structure and a second antenna structure through a feed terminal in the RFID tag.

6. The RFID reader system according to claim 5, wherein the first antenna structure is electromagnetically coupled to the second antenna structure in a tag antenna of the RFID tag, wherein the first antenna structure is configured to generate the first backscattered signal in high frequency band and the second antenna structure is configured to generate the second backscattered signal in low frequency band.

7. The RFID reader system according to claim 1, wherein a tag antenna of the RFID tag comprises different sub-antennas, each sub-antenna being configured for a corresponding frequency band.

8. The RFID reader system according to claim 1, wherein the second phase angle of the second backscattered signal is unique at a distance up to half of wavelength of the second RF interrogation signal.

9. The RFID reader system according to claim 1, wherein the RFID reader and the radio transceiver device are further configured to receive data from the RFID tag via the first backscattered signal and the second backscattered signal, respectively.

10. The RFID reader system according to claim 1, wherein a first signal processor in the RFID reader is further configured to:
  determine the first phase angle of the received first backscattered signal; and
  transmit the determined first phase angle to the main control unit.

11. The RFID reader system according to claim 1, wherein a second signal processor in the radio transceiver device is further configured to:
  determine the second phase angle of the received second backscattered signal; and
  transmit the determined second phase angle to the main control unit.

12. The RFID reader system according to claim 1, wherein the selection of the one of the plurality of first distances is based on proximity to the determined second distance.

13. The RFID reader system according to claim 1, wherein the main control unit is further configured to cause the determined final distance between the RFID reader system and the RFID tag to be displayed at a user interface on a display of the RFID reader system.

14. The RFID reader system according to claim 1, wherein the main control unit is further configured to transmit the determined final distance between the RFID reader system and the RFID tag, through a communication network, to a remote processing device operable in a specific application area.

15. A method for determining radio frequency identification (RFID) tag distance, the method comprising:
  receiving, by an RFID reader of a RFID reader system, a first backscattered signal from an RFID tag in response to a transmission of a first radio frequency (RF) interrogation signal, wherein the RFID reader is operable at a first frequency band;
  determining, by the RFID reader of the RFID reader system, a first phase angle of the received first backscattered signal;
  receiving, by a radio transceiver device of the RFID reader system, a second backscattered signal from the RFID tag in response to a transmission of a second RF interrogation signal, wherein the radio transceiver device is operable at a second frequency band different from the first frequency band; and
  determining, by the radio transceiver device of the RFID reader system, a second phase angle of the received second backscattered signal;
  determining, by the RFID reader system, a plurality of first distances based on the first phase angle;
  determining, by the RFID reader system, a second distance based on the second phase angle; and
  selecting, by the RFID reader system, one of the plurality of first distances as a final distance between the RFID reader system and the RFID tag based on the determined second distance.

16. The method according to claim 15, wherein the transmission of the second RF interrogation signal is simultaneous to the transmission of the first RF interrogation signal.

17. The method according to claim 15, wherein the transmission of the second RF interrogation signal is in time alternating manner with respect to the first RF interrogation signal.

18. The method according to claim 15, wherein the selection of the one of the plurality of first distances is based on proximity to the determined second distance.

19. The method according to claim 15, further comprising causing the determined final distance between the RFID reader system and the RFID tag to be displayed at a user interface on a display of the RFID reader system.

20. The method according to claim 15, further comprising transmitting, through a communication network, the determined final distance between the RFID reader system and the RFID tag to a remote processing device operable in a specific application area.

* * * * *